United States Patent
Fu et al.

(10) Patent No.: US 7,050,876 B1
(45) Date of Patent: May 23, 2006

(54) MANUFACTURING METHODS AND SYSTEMS FOR RAPID PRODUCTION OF HEARING-AID SHELLS

(75) Inventors: Ping Fu, Chapel Hill, NC (US);
Dmitry Nekhayev, Durham, NC (US);
Herbert Edelsbrunner, Chapel Hill, NC (US)

(73) Assignee: Phonak Ltd., Stafa (CH)

( * ) Notice: Subject to any disclaimer, the term of this patent is extended or adjusted under 35 U.S.C. 154(b) by 1174 days.

(21) Appl. No.: 09/684,184

(22) Filed: Oct. 6, 2000

(51) Int. Cl.
*G06F 19/00* (2006.01)

(52) U.S. Cl. .................. 700/118; 700/98; 700/163; 700/182; 715/700; 345/420; 703/73

(58) Field of Classification Search ........... 700/118, 700/163, 182; 345/420; 715/700; 703/13
See application file for complete search history.

(56) References Cited

U.S. PATENT DOCUMENTS

| | | | |
|---|---|---|---|
| 4,569,812 A | 2/1986 | Werwath et al. | 264/222 |
| 4,652,414 A | 3/1987 | Schlaegel | 264/154 |
| 4,719,585 A | 1/1988 | Cline et al. | 364/518 |
| 4,870,688 A | 9/1989 | Voroba et al. | 381/60 |
| 5,056,204 A | 10/1991 | Bartschi | 29/169.5 |
| 5,084,224 A | 1/1992 | Watters | 264/155 |
| 5,121,333 A | 6/1992 | Riley et al. | 364/474.05 |
| 5,357,576 A | 10/1994 | Arndt | 381/68.6 |
| 5,398,193 A | 3/1995 | deAngelis | 364/468 |
| 5,487,012 A * | 1/1996 | Topholm et al. | 700/163 |
| 5,587,913 A | 12/1996 | Abrams et al. | 364/468.26 |
| 5,600,060 A | 2/1997 | Grant | 73/147 |
| 5,617,322 A | 4/1997 | Yokota | 364/468.04 |

(Continued)

FOREIGN PATENT DOCUMENTS

JP 62-032800 2/1987

(Continued)

OTHER PUBLICATIONS

"Computing Dirichlet tessallations," Bowyer, The Computer Journal, vol. 24, No. 2, 1981, pp. 162-166.

(Continued)

*Primary Examiner*—Leo Picard
*Assistant Examiner*—Douglas S. Lee
(74) *Attorney, Agent, or Firm*—Pearne & Gordon LLP

(57) ABSTRACT

Methods, apparatus and computer program products provide efficient techniques for designing and printing shells of hearing-aid devices with a high degree of quality assurance and reliability and with a reduced number of manual and time consuming production steps and operations. These techniques also preferably provide hearing-aid shells having internal volumes that can approach a maximum allowable ratio of internal volume relative to external volume. These high internal volumes facilitate the inclusion of hearing-aid electrical components having higher degrees of functionality and/or the use of smaller and less conspicuous hearing-aid shells. A preferred method includes operations to generate a watertight digital model of a hearing-aid shell by thickening a three-dimensional digital model of a shell surface in a manner that eliminates self-intersections and results in a thickened model having an internal volume that is a high percentage of an external volume of the model. This thickening operation preferably includes nonuniformly thickening the digital model of a shell surface about a directed path that identifies a location of an undersurface hearing-aid vent. This directed path may be drawn on the shell surface by a technician (e.g., audiologist) or computer-aided design operator, for example. Operations are then preferably performed to generate a digital model of an undersurface hearing-aid vent in the thickened model of the shell surface, at a location proximate the directed path.

80 Claims, 14 Drawing Sheets

U.S. PATENT DOCUMENTS

| | | | |
|---|---|---|---|
| 5,621,648 A | 4/1997 | Crump | 364/468.19 |
| 5,760,783 A | 6/1998 | Migdal et al. | 345/473 |
| 5,850,229 A | 12/1998 | Edelsbrunner et al. | 345/473 |
| 5,866,058 A | 2/1999 | Batchelder et al. | 264/237 |
| 5,875,254 A | 2/1999 | Hanright | 381/329 |
| 5,886,702 A | 3/1999 | Migdal et al. | 345/423 |
| 5,889,874 A | 3/1999 | Schmitt et al. | 381/328 |
| 5,915,031 A | 6/1999 | Hanright | 381/323 |
| 5,939,008 A | 8/1999 | Comb et al. | 264/308 |
| 5,948,342 A | 9/1999 | Nakazawa et al. | 264/400 |
| 5,968,561 A | 10/1999 | Batchelder et al. | 425/375 |
| 5,995,650 A | 11/1999 | Migdal et al. | 345/154 |
| 6,022,311 A | 2/2000 | Juneau et al. | 600/25 |
| 6,044,170 A | 3/2000 | Migdal et al. | 382/154 |
| 6,069,963 A | 5/2000 | Martin et al. | 381/313 |
| 6,100,893 A * | 8/2000 | Ensz et al. | 345/420 |
| 6,103,156 A | 8/2000 | Holtzberg | 264/102 |
| 6,108,006 A | 8/2000 | Hoppe | 345/423 |
| 6,110,409 A | 8/2000 | Allanic et al. | 264/401 |
| 6,133,921 A * | 10/2000 | Turkiyyah et al. | 345/420 |
| 6,167,138 A | 12/2000 | Shennib | 381/60 |
| 6,176,427 B1 | 1/2001 | Antognini et al. | 235/454 |
| 6,205,243 B1 | 3/2001 | Migdal et al. | 382/154 |
| 6,208,347 B1 | 3/2001 | Migdal et al. | 345/419 |
| 6,256,038 B1 | 7/2001 | Krishnamurthy | 345/419 |
| 6,256,039 B1 | 7/2001 | Krishnamurthy | 345/420 |
| 6,271,856 B1 | 8/2001 | Krishnamurthy | 345/429 |
| 6,285,372 B1 | 9/2001 | Cowsar et al. | 345/425 |
| 6,374,198 B1 | 4/2002 | Schifa | 703/2 |
| 6,377,865 B1 | 4/2002 | Edelsbrunner et al. | 700/98 |
| 6,401,859 B1 | 6/2002 | Widmer et al. | 181/135 |
| 6,420,698 B1 | 7/2002 | Dimsdale | 250/234 |
| 6,484,842 B1 | 11/2002 | Widmer et al. | 181/129 |
| 6,496,587 B1 | 12/2002 | Mueller | 381/330 |
| 6,512,993 B1 | 1/2003 | Kacyra | 702/159 |
| 6,532,299 B1 | 3/2003 | Sachdeva | 382/128 |
| 6,545,676 B1 | 4/2003 | Ryan | 345/423 |
| 2002/0006217 A1 | 1/2002 | Rubbert | 382/131 |
| 2002/0059042 A1 | 5/2002 | Kacyra | 702/152 |
| 2002/0114537 A1 | 8/2002 | Sutula, Jr. | 382/285 |
| 2002/0136420 A1 | 9/2002 | Topholm | 381/312 |
| 2002/0138237 A1 | 9/2002 | Topholm | 703/1 |
| 2002/0145607 A1 | 10/2002 | Dimsdale | 345/423 |
| 2002/0158880 A1 | 10/2002 | Williams | 345/582 |
| 2002/0176584 A1 | 11/2002 | Kates | 381/60 |
| 2002/0196954 A1 | 12/2002 | Marxen et al. | 381/312 |
| 2002/0198437 A1 | 12/2002 | Juneau et al. | 600/25 |
| 2003/0001835 A1 | 1/2003 | Dimsdale | 345/419 |
| 2003/0021434 A1 | 1/2003 | Hessel et al. | 381/312 |
| 2003/0034976 A1 | 2/2003 | Raskar | 345/427 |
| 2003/0058242 A1 | 3/2003 | Redlich | 345/427 |
| 2003/0067461 A1 | 4/2003 | Fletcher et al. | 345/420 |
| 2003/0071194 A1 | 4/2003 | Mueller | 250/208.1 |
| 2003/0072011 A1 | 4/2003 | Shirley | 356/601 |
| 2003/0074174 A1 * | 4/2003 | Fu et al. | 703/13 |

FOREIGN PATENT DOCUMENTS

| | | |
|---|---|---|
| JP | 09-10300 | 4/1997 |
| JP | 091030000 A | 4/1997 |
| JP | 11055796 A | 2/1999 |
| WO | WO 85/04779 | 10/1985 |
| WO | WO 92/03894 | 3/1992 |
| WO | WO 92/11737 | 7/1992 |
| WO | WO92/11737 | 7/1992 |
| WO | WO 00/08895 | 2/2000 |
| WO | WO 00/19769 | 4/2000 |
| WO | WO 00/19935 | 4/2000 |
| WO | WO 00/34739 | 6/2000 |
| WO | WO 00/36564 | 6/2000 |
| WO | WO 00/70911 | 11/2000 |
| WO | WO 00/76268 | 12/2000 |
| WO | WO 01/05207 | 1/2001 |
| WO | WO01/52737 A1 | 1/2001 |
| WO | WO01/087001 A2 | 7/2001 |
| WO | WO01/087001 A3 | 7/2001 |
| WO | WO02/071794 A1 | 9/2002 |
| WO | WO03/027961 | 4/2003 |

OTHER PUBLICATIONS

"Optimal Surface Reconstruction From Planar Contours," Fuchs et al., Communications, vol. 20, Oct. 1977, pp. 693-702.

"Geometric Structures for Three-Dimensional Shape Representation," Boissonnat, ACM Transactions on Graphics, vol. 3, No. 4, Oct. 1984, pp. 267-286.

"Shape Reconstruction From Planar Cross Sections," Boissonnat, Computer Vision, Graphics and Image Processing, vol. 44, 1988, pp. 1-29.

"Construction of three-dimensional Delaunay triangulations using local transformations," Joe, Computer Aided Geometric Design, vol. 8, 1999, pp. 123-142.

"Surface Reconstruction From Unorganized Points," Hoppe et al. Computer Graphics, vol. 26, Jul. 1992, pp. 71-78.

"Surfaces From Contours," Meyers et al., ACM Transactions on Graphics, vol. 11, No. 3, Jul. 1992, pp. 228-258.

"Closed Object Boundaries From Scattered Points," Remco Coenraad Veltkamp, Proefschrift Rotterdam, Netherlands, 1991, pp. 1-149.

"Mesh Optimization," Hoppe et al., Computer Graphics Proceedings, Annual Conference Series, 1993, pp. 19-26.

"Incremental Topological Flipping Works for Regular Triangulations," Edelsbrunner et al., Algorithmica, 1996, pp. 223-241.

"Three-Dimensional Alpha Shapes," Edelsbrunner et al., ACM Transactions on Graphics., vol. 13, No. 1, Jan. 1994, pp. 43-72.

"Piecewise Smooth Surface Reconstruction," Hoppe et al., Computer Graphics Proceedings, Annual Conference Series, 1994, pp. 295-302.

"Smooth Spline Surfaces Over Irregular Meshes," Loop, Computer Graphics Proceedings, Annual Conference Series, 1994, pp. 303-310.

"C-Surface Splines," Peters, Society for Industrial and Applied Mathematics, vol. 32, No. 2, 1995, pp. 645-666.

"Modeling With Cubic A-Patches," Bajaj et al., ACM Transactions on Graphics, vol. 14, No. 2, Apr. 1995, pp. 103-133.

"Automatic Reconstruction of Surfaces and Scalar Fields from 3D Scans," Bajaj et al., Computer Graphics Proceedings, Annual Conference Series, 1995, pp. 109-118.

"Piecewise-Linear Interpolation Between Polygonal Slices," Barequet et al., Computer Vision and Image Understanding, vol. 63, No. 2, Mar. 1996, pp. 251-272.

"A Volumetric Method for Building Complex Models from Range Images," Curless et al., Computer Graphics Proceedings, Annual Conference Series, Aug. 1996, pp. 303-312.

"Automatic Reconstruction of B-Spline Surfaces of Arbitrary Topological Type," Eck et al., Computer Graphics Proceedings, Annual Conference Series, Aug. 1996, pp. 325-334.

"Fitting Smooth Surfaces to Dense Polygon Meshes," Krishnamurthy et al., SIGGRAPH 96, New Orleans, Louisiana, Aug. 4-9, 1996, pp. 313-324.

Zomorodian et al., "Fast Software for Box Intersections," International Journal of Computational Geometry & Applications, World Scientific Publishing Company, pp. 1-30.

Chen et al., "Surface modeling of range data by constrained triangulation," Computer Aided Design, vol. 26, No. 8, Aug. 1994, pp. 632-645.

Dey et al., "Delaunay Based Shape Reconstruction from Large Data," Proceedings IEEE 2001 Symposium on Parallel and Large-Data Visualization and Graphics, Oct. 22-23, 2001, pp. 19-27.

Mencl et al., "Graph-Based Surface Reconstruction Using Structures in Scattered Point Sets," Computer Graphics International, Proceedings Hannover, Germany, Jun. 22-26, 1998, pp. 298-311.

Chen et al., "Wing Representation for Rigid 3D Objects," Proceedings of the International Conference on Pattern Recognition, Atlantic City, Jun. 16-21, 1990, pp. 398-402.

International Search Report, PCT/US02/24220, May 22, 2003.

* cited by examiner

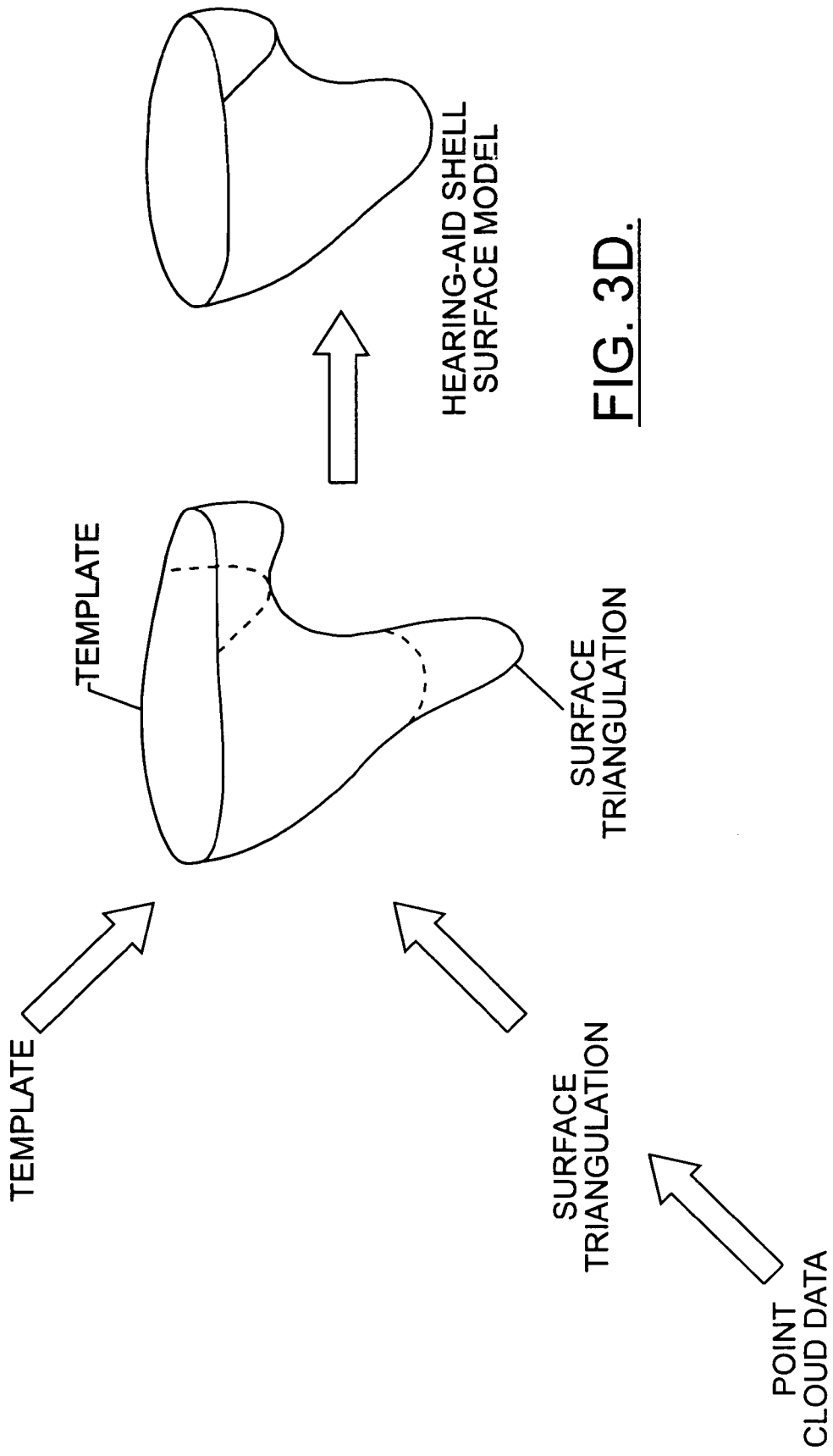

MANUFACTURING METHODS AND SYSTEMS FOR RAPID PRODUCTION OF HEARING-AID SHELLS

FIELD OF THE INVENTION

This invention relates to manufacturing methods and systems that utilize computer-aided-design (CAD) and computer-aided manufacturing (CAM) techniques and, more particularly, to manufacturing methods and systems for production of custom medical devices.

BACKGROUND OF THE INVENTION

Techniques for designing and manufacturing in-ear hearing-aid devices typically need to be highly customized in both internal dimensions to support personalized electrical components to remedy a individual's particular hearing loss need, and in external dimensions to fit comfortably and securely within an ear canal of the individual. Moreover, cosmetic considerations also frequently drive designers to smaller and smaller external dimensions while considerations of efficacy in hearing improvement typically constrain designers to certain minimal internal dimensions notwithstanding continued miniaturization of the electrical components.

FIG. 1 illustrates a conventional production process flow 10 for manufacturing customized in-ear hearing-aid devices. As illustrated by Block 12, a positive mold of an ear canal of a subject is generated along with a negative mold that may be used for quality assurance by acting as the "ear" of the subject when testing a finally manufactured hearing-aid shell. As will be understood by those familiar with conventional hearing-aid manufacturing techniques, the positive mold may be generated by an audiologist after performing a routine hearing examination of the subject and the negative mold may be generated by a manufacturer that has received the positive mold and a request to manufacture a customized hearing-aid shell. Referring now to Block 14, a detailed positive mold of a hearing-aid shell may then be generated by the manufacturer. This detailed positive mold may be generated by manually sculpting the positive mold to a desired size suitable for receiving the necessary electrical components to remedy the defective auditory condition of the subject. A detailed shell cast is then formed from the detailed positive mold, Block 16, and this shell cast is used to form a plastic hearing-aid shell, Block 18.

As illustrated by Block 20, a vent structure may then be attached (e.g., glued) to an inner surface of the plastic hearing-aid shell. Manual trimming and surface smoothing operations may then be performed, Block 22, so that the shell is ready to receive a faceplate. The faceplate may then be attached to a flat surface of the shell and then additional trimming and smoothing operations may be performed to remove abrupt edges and excess material, Block 24. The electrical components may then be added to the shell, Block 26, and the shape of the resulting shell may be tested using the negative mold, Block 28. A failure of this test typically cause the manufacturing process to restart at the step of generating a detailed positive mold, Block 14. However, if the manufactured shell passes initial quality assurance, then the shell with electrical components may be shipped to the customer, Block 30. Steps to fit and functionally test the received hearing-aid shell may then be performed by the customer's audiologist. A failure at this stage typically requires the repeat performance of the process flow 10 and the additional costs and time delay associated therewith.

Unfortunately, these conventional techniques for designing and manufacturing customized in-ear hearing-aid devices typically involve a large number of manual operations and have a large number of drawbacks. First, manual hearing-aid shell creation through sculpting is error prone and considered a main contributor in a relatively high customer rejection rate of 20 to 30%. Second, the typically large number of manual operations that are required by conventional techniques frequently act as a bottleneck to higher throughput and often limit efforts to reduce per unit manufacturing costs. Accordingly, there exists a need for more cost effective manufacturing operations that have higher throughput capability and can achieve higher levels of quality assurance.

SUMMARY OF THE INVENTION

Methods, apparatus and computer program products of the present invention provide efficient techniques for designing and printing shells of hearing-aid devices with a high degree of quality assurance and reliability and with a reduced number of manual and time consuming production steps and operations. These techniques also preferably provide hearing-aid shells having internal volumes that can approach a maximum allowable ratio of internal volume relative to external volume. These high internal volumes facilitate the inclusion of hearing-aid electrical components having higher degrees of functionality and/or the use of smaller and less conspicuous hearing-aid shells.

A first preferred embodiment of the present invention includes operations to generate a watertight digital model of a hearing-aid shell by thickening a three-dimensional digital model of a shell surface in a manner that preferably eliminates self-intersections and results in a thickened model having an internal volume that is a high percentage of an external volume of the model. This thickening operation preferably includes nonuniformly thickening the digital model of a shell surface about a directed path that identifies a location of an undersurface hearing-aid vent. This directed path may be drawn on the shell surface by a technician (e.g., audiologist) or computer-aided design operator, for example. Operations are then preferably performed to generate a digital model of an undersurface hearing-aid vent in the thickened model of the shell surface, at a location proximate the directed path.

A second embodiment of the present invention includes operations to generate a first digital representation of a positive or negative image of at least a portion of an ear canal of a subject. The first digital representation is a representation selected from the group consisting of a point cloud representation, a 2-manifold triangulation, a 2-manifold with nonzero boundary triangulation and a volume triangulation. A second digital representation of a hearing-aid shell is then generated having a shape which conforms to the ear canal of the subject. This second digital representation may be derived directly or indirectly from at least a portion of the first digital representation. Operations are then performed to print a hearing-aid shell that conforms to the ear canal of the subject, based on the second digital representation. Templates may also be used to facilitate generation of the second digital representation. In particular, the operation to generate the second digital representation may comprise modifying a shape of the first digital representation to more closely conform to a shape of a digital template of a hearing-aid shell and/or modifying the shape of the digital template to more closely conform to the shape of the first digital representation. This digital template is preferably a surface triangulation that constitutes a 2-manifold with nonzero boundary. However, the digital template may be a three-dimensional model of a generic hearing-aid shell having a uniform or nonuniform thickness, and possibly even a vent.

The operation to generate a second digital representation may include operations to generate a three-dimensional model of a hearing-aid shell surface that is a 2-manifold or 2-manifold with nonzero boundary and then thicken the three-dimensional model of the hearing-aid shell surface using operations that move each of a plurality of vertices on the shell surface along a respective path that is normal to an inner shell surface. This thickening operation preferably includes an operation to nonuniformly thicken the three-dimensional model of the hearing-aid shell surface about a directed path thereon. A uniform thickening operation may then be performed along with an operation to generate an undersurface hearing-aid vent in the thickened model of the shell surface, at a location proximate the directed path. A combination of a local nonuniform thickening operation to enable vent formation followed by a global uniform thickening operation to define a desired shell thickness enables the formation of a custom hearing-aid shell having a relatively large ratio of interior volume to exterior volume and the printing of shells with built-in vents.

An additional embodiment of the present invention provides an efficient method of performing quality assurance by enabling a comparison between a digital model of a hearing-aid shell and a digital model of a printed and scanned hearing-aid shell. In particular, operations may be performed to generate a first three-dimensional digital model of a hearing-aid shell and then print a hearing-aid shell based on the first three-dimensional digital model. Point cloud data is then generated by scanning the printed hearing-aid shell. From this point cloud data, a second three-dimensional digital model of a hearing-aid shell surface is generated. To evaluate the accuracy of the printing process, the second three-dimensional digital model of a hearing-aid shell surface is digitally compared against the first three-dimensional digital model of a hearing-aid shell to detect differences therebetween. This second three-dimensional digital model may also be compared against earlier digital representations of the shell to verify various stages of the manufacturing process.

BRIEF DESCRIPTION OF THE DRAWINGS

FIG. 3D illustrates the use of a hearing-aid template to facilitate conversion of a surface triangulation into a shell surface model.

DESCRIPTION OF A PREFERRED EMBODIMENT

The present invention now will be described more fully hereinafter with reference to the accompanying drawings, in which preferred embodiments of the invention are shown. This invention may, however, be embodied in many different forms and applied to other articles and should not be construed as limited to the embodiments set forth herein; rather, these embodiments are provided so that this disclosure will be thorough and complete, and will fully convey the scope of the invention to those skilled in the art. The operations of the present invention, as described more fully hereinbelow and in the accompanying figures, may be performed by an entirely hardware embodiment or, more preferably, an embodiment combining both software and hardware aspects and some degree of user input. Furthermore, aspects of the present invention may take the form of a computer program product on a computer-readable storage medium having computer-readable program code embodied in the medium. Any suitable computer-readable medium may be utilized including hard disks, CD-ROMs or other optical or magnetic storage devices. Like numbers refer to like elements throughout.

Various aspects of the present invention are illustrated in detail in the following figures, including flowchart illustrations. It will be understood that each of a plurality of blocks of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each of a plurality of blocks of the flowchart illustrations, and combinations of blocks in the flowchart illustrations, can be implemented by special purpose hardware-based computer systems which perform the specified functions or steps, or by combinations of special purpose hardware and computer instructions.

Figure 2:
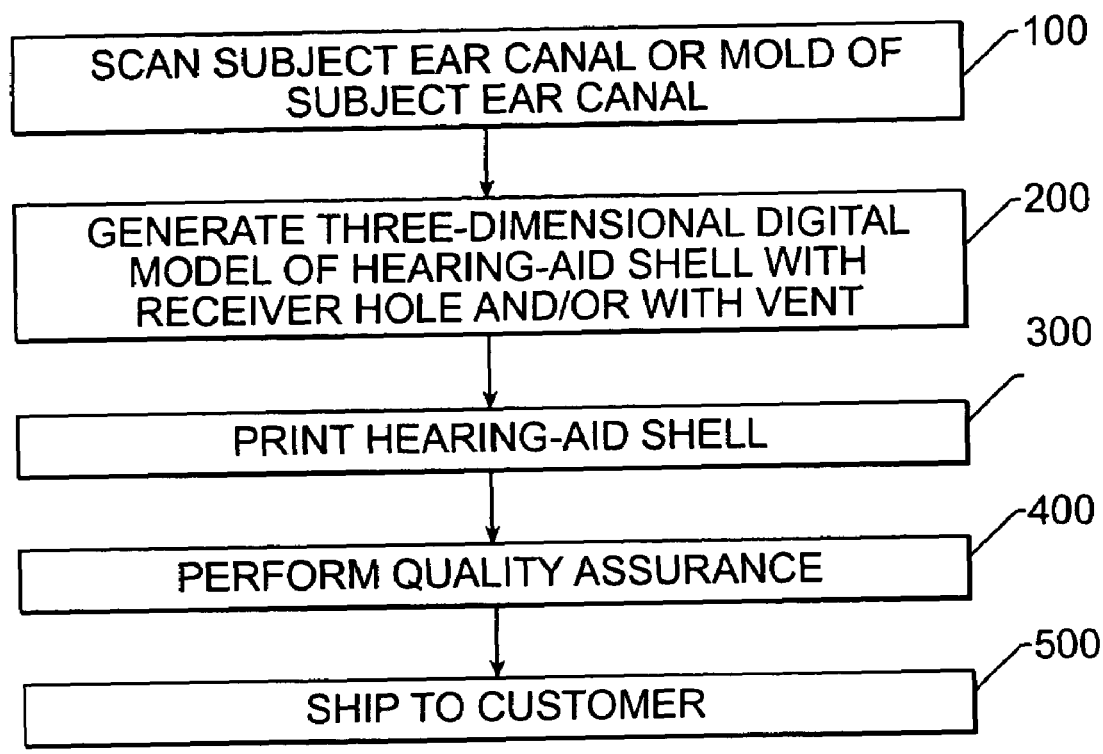
FIG. 2 is a high level flow diagram of operations that illustrate preferred methods of manufacturing hearing-aid shells in accordance with an embodiment of the present invention.

Referring now to FIG. 2, preferred manufacturing methods and systems for rapid production of hearing-aid shells may initially perform conventional operations 100 to (i) three-dimensionally scan an ear canal of a subject or a positive or negative mold of the ear canal of the subject, and (ii) generate scan data that digitally describes a shape of at least a portion of the shape of the ear canal. This scan data may take the form of a point cloud data file. The data files may be provided in an ASCII xyz data format by conventional digitizers, including those manufactured by Cyberware™, Digibotics™, Laser Design™, Steinbichler™, Hymarc™ and Minolta™, for example.

Figure 5:
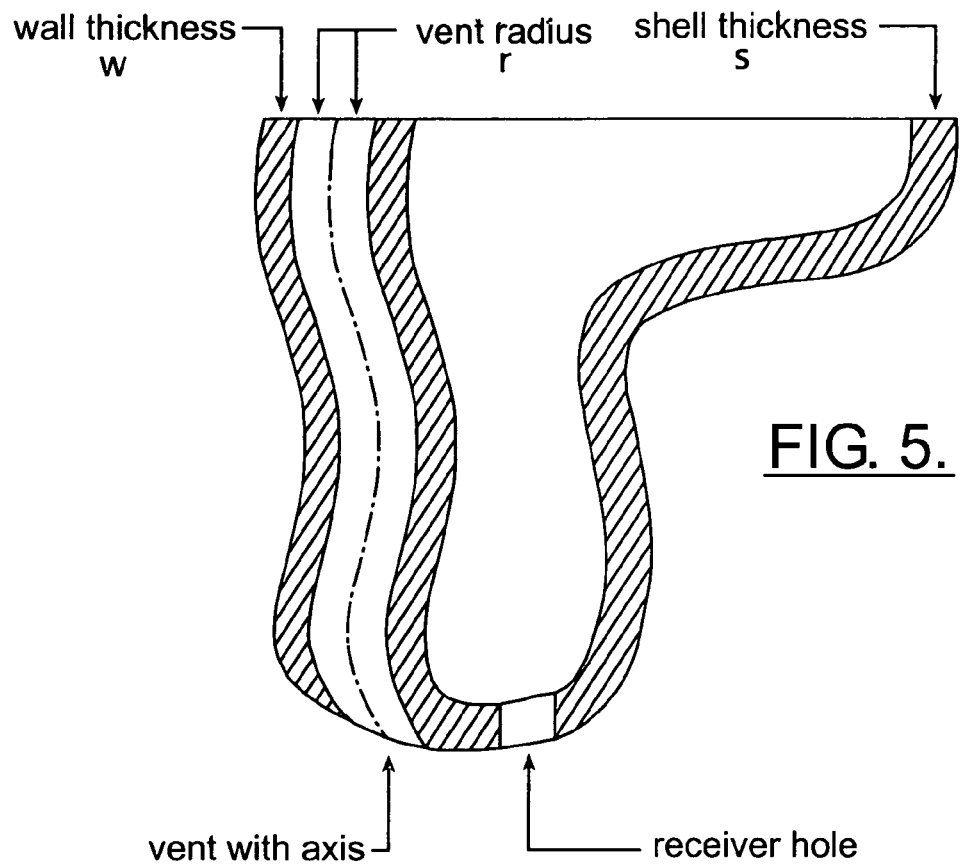
FIG. 5 is a cross-sectional view of a finished hearing-aid shell. The shaded area indicates wall and shell thickness. The vent is a relatively long tunnel routed through the shell. The receiver hole is a short tunnel.

As illustrated by Block 200, preferred operations are then performed to generate a three-dimensional digital model of a hearing-aid shell with vent, from the scan data. A cross-sectional view of an exemplary hearing-aid shell is illustrated by FIG. 5. These operations may include initial operations to convert the point cloud data into a volume triangulation (e.g., tetrahedrized model) and then into a digital polygonal surface model, preferably a surface triangulation that models a shape of at least a portion of the ear canal of the subject. This may be done by removing all tetrahedra and retaining only the boundary of the volume model. Preferred examples of one or more aspects of these conversion operations are more fully described in commonly assigned U.S. application Ser. No. 09/248,587, filed Feb. 11, 1999, entitled "Method of Automatic Shape Reconstruction", now U.S. Pat. No. 6,377,865; and in U.S. application Ser. No. 09/607,122, filed Jun. 29, 2000, entitled "Methods, Apparatus and Computer Program Products for Automatically Generating Nurbs Models of Triangulated Surfaces Using Homeomorphisms", now U.S. Pat. No. 6,996,505, the disclosures of which are hereby incorporated herein by reference. These conversion operations may also include techniques to generate a Delaunay complex of point cloud data points. Techniques to generate Delaunay complexes are more fully described in commonly assigned U.S. Pat. No. 5,850,229 to Edelsbrunner et al., entitled "Apparatus and Method for Geometric Morphing", the disclosure of which is hereby incorporated herein by reference. The conversion operations may also include point manipulation techniques such as "erase" for removing a set of selected points, "crop" for removing all selected points, "sample" for selecting a percentage of points and "add points" for adding points to the point set using a depth plane. The operations for creating polygonal models may use geometric techniques to infer the shape of the ear canal from a set of data points in a point cloud data file, by building a Wrap™ model of the point set using strict geometric rules to create a polygonal surface (e.g., triangulated surface) around the point set that actually passes through the points. These operations may be provided by commercially available software, Geomagic Wrap 4.0™, manufactured by Raindrop Geomagic, Inc. of Research Triangle Park, N.C., assignee of the present application.

Figure 1:
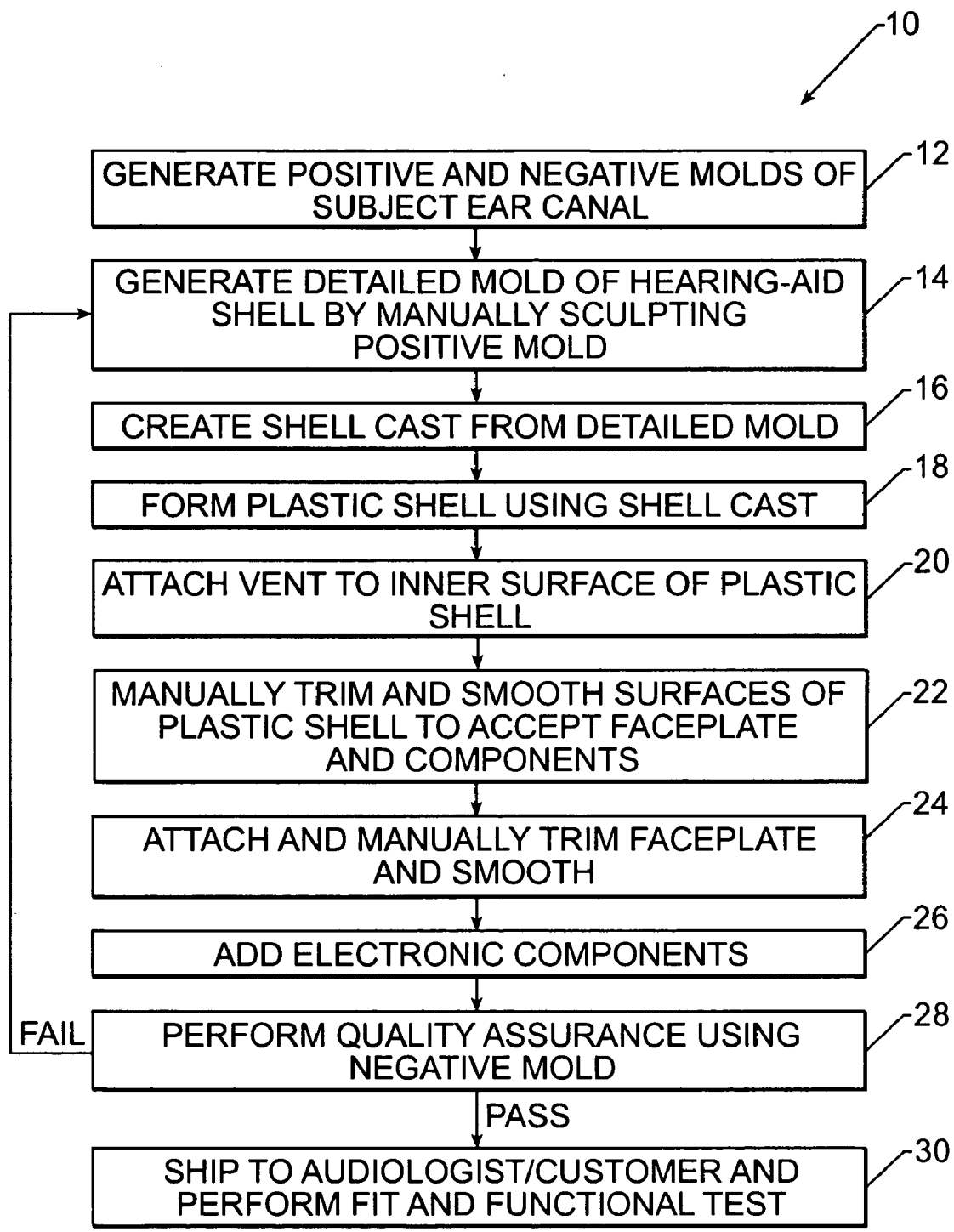
FIG. 1 is a flow diagram of a conventional production process flow for manufacturing customized in-ear hearing-aid devices.

As described more fully hereinbelow with respect to FIGS. 3–22, operations 200 to generate a three-dimensional digital model of a hearing-aid shell preferably include operations to thicken a three-dimensional model of a hearing-aid shell surface and then define and merge a digital model of a vent into the thickened three-dimensional model. Operations may then be performed to print a hearing-aid shell having a vent therein, based on the three-dimensional digital model of a hearing-aid shell, Block 300. Conventional operations may then be performed to assure quality, Block 400. More preferably, quality assurance operations may include operations to scan the printed hearing-aid shell and generate a three-dimensional model of the printed shell based on the scan. Among other things, this three-dimensional model of the printed shell may be compared to the three-dimensional model of the hearing-aid shell generated at Block 200 in order to verify the accuracy of the printing process. Alternatively, or in addition, the overall automated design process may be verified by comparing the three-dimensional model of the printed shell to see if it conforms with the original surface triangulation that models a shape of the ear canal and was generated from the original scan data (e.g., point cloud data). The quality assurance operations 400 may also be preceded by conventional operations to attach a faceplate to the printed shell and add electronic components, such as those operations illustrated by Blocks 24 and 26 of FIG. 1. However, more preferred operations to attach, trim and finish a faceplate may be performed digitally during the operations for generating a three-dimensional digital model of a hearing-aid shell with vent, Block 200. Finally, as illustrated by Block 500, a finished hearing-aid shell is then shipped to the customer.

Figure 3A:
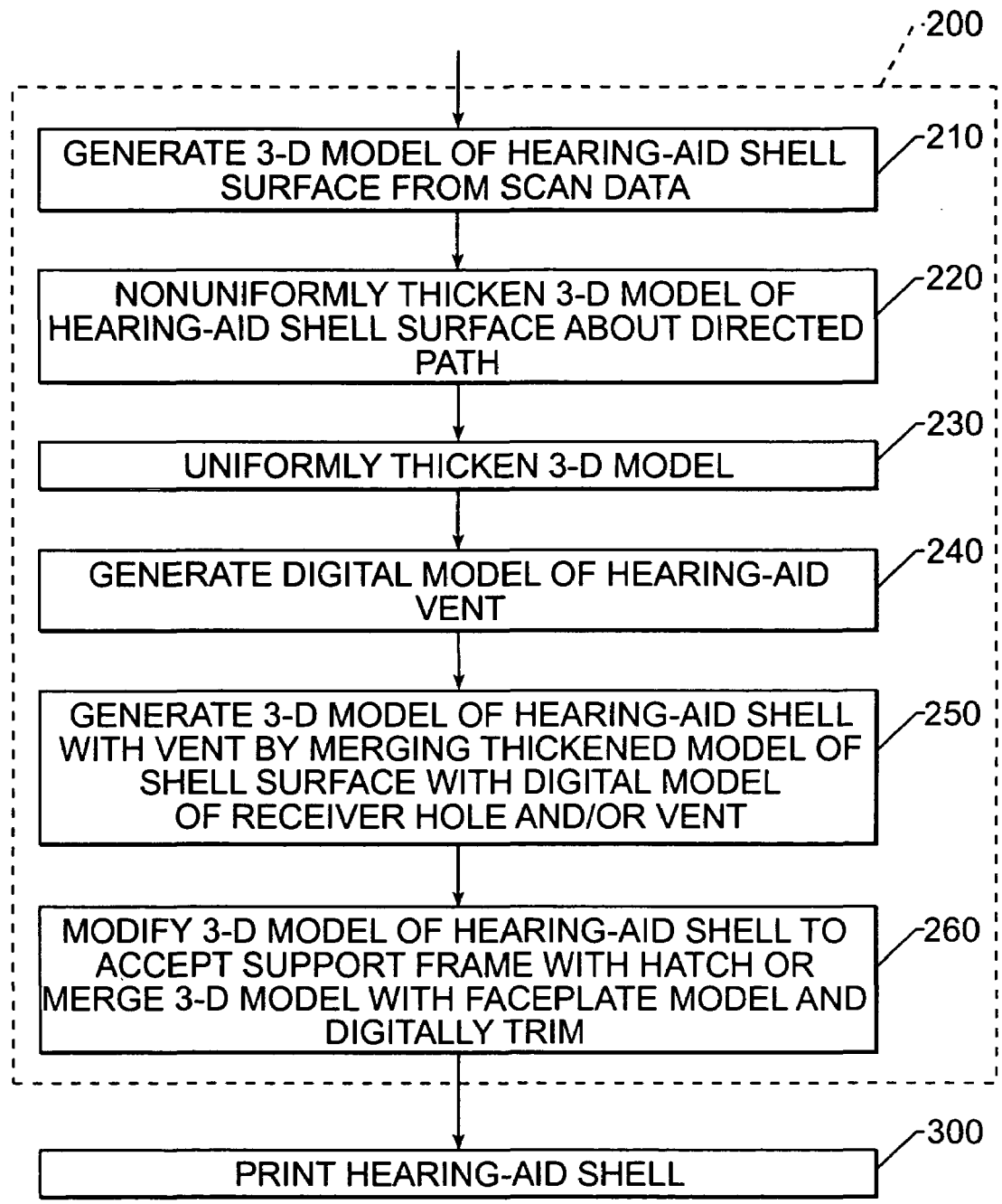
FIG. 3A is a flow diagram of operations that illustrates preferred methods of generating digital models of shells from scan data.
Figure 3B:
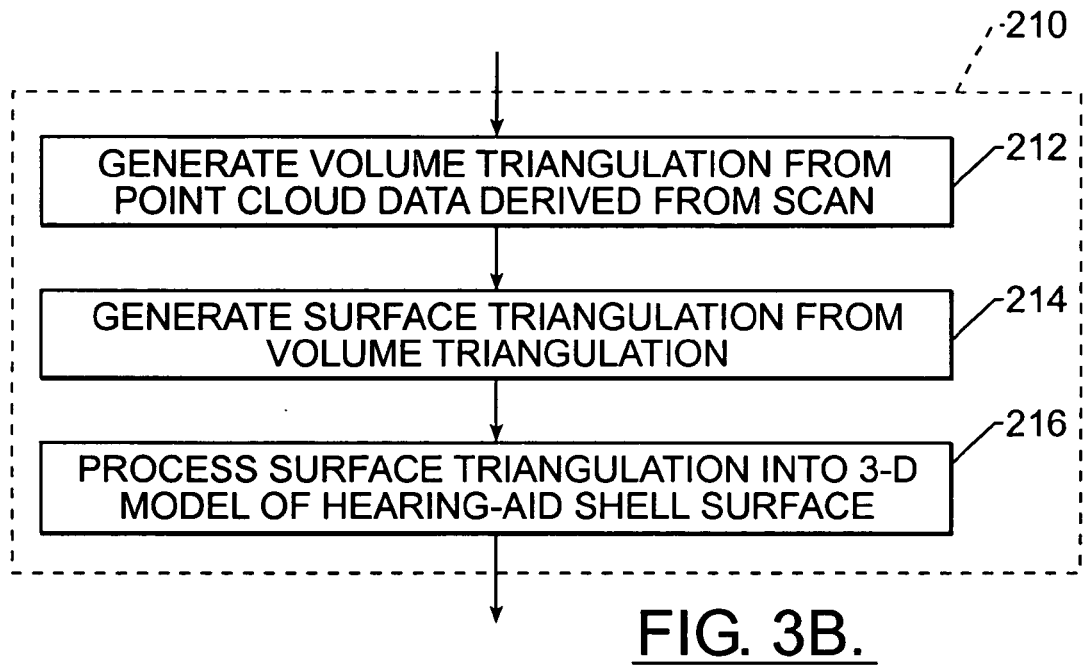
FIG. 3B is a flow diagram of operations that illustrates methods of converting scan data into three-dimensional models of hearing-aid shell surfaces.
Figure 6:
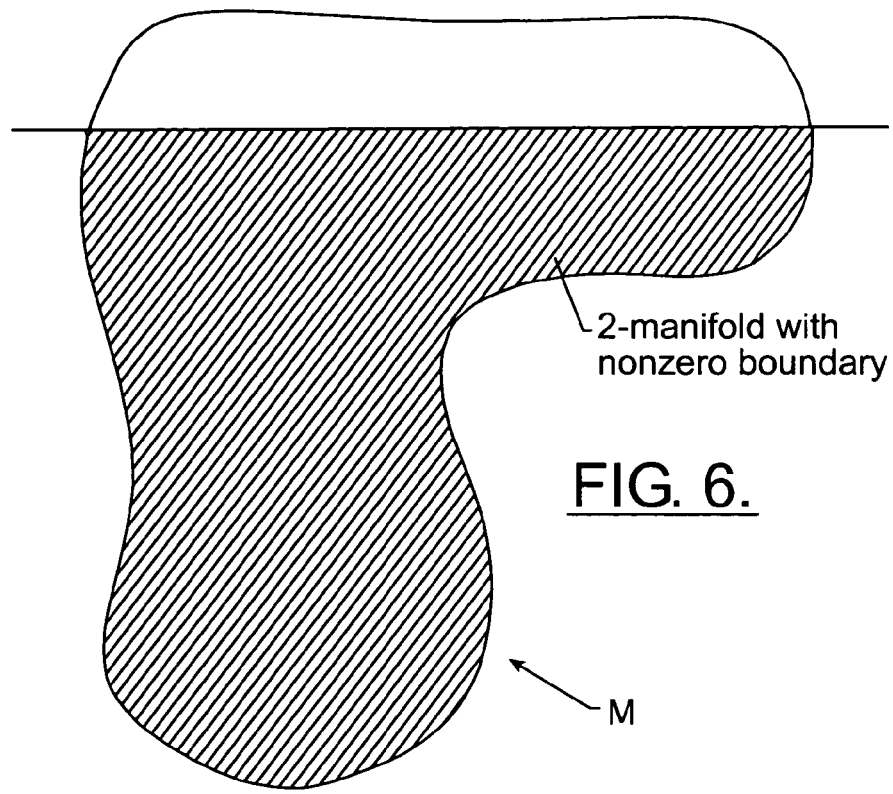
FIG. 6 is a side view of a 2-manifold M cut by a plane. The resulting 2-manifold with nonzero boundary is shaded.
Figure 7:
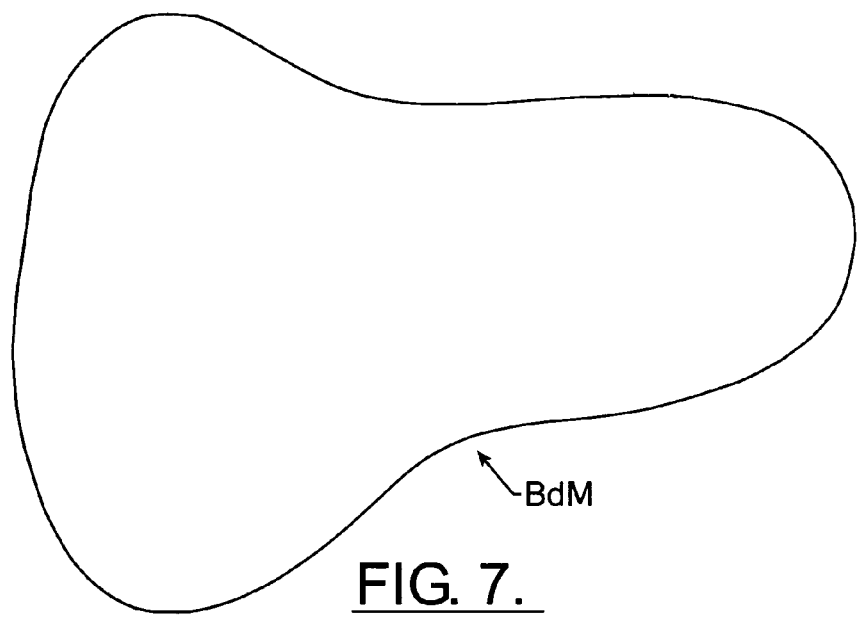
FIG. 7 is a top view of a 2-manifold with nonzero boundary showing only the boundary BdM.

Referring now to FIGS. 3A–3D, preferred operations 200 for generating a three-dimensional model of a hearing-aid shell with vent will now be described in greater detail. In particular, Block 210 illustrates an operation for generating a 3-D model of a hearing-aid shell surface from the scan data (e.g., point cloud data). As illustrated by FIG. 3B, this operation may include generating a volume triangulation from the point cloud data, Block 212, and then generating a surface triangulation as a 2-manifold or 2-manifold with nonzero boundary, Block 214. To an operator of a computer-aided design tool, these operations of passing from scan data to a volume triangulation and then to a surface triangulation may be automatic. At this point, the surface triangulation may describe a substantially greater portion of the ear canal of the subject than is absolutely necessary to create a three-dimensional model of a hearing-aid shell surface. The operation of Blocks 212 and 214 may also be skipped in the event the surface triangulation is provided as an input file to a computer-aided design (CAD) workstation. In addition, other techniques may be used when converting from scan data to the surface triangulation and these techniques may not require an intermediate operation of generating a volume triangulation. A triangulated surface may be referred to as a 2-manifold if (i) every edge belongs to exactly two triangles, and (ii) every vertex belongs to a ring of triangles homeomorphic to a disk. Alternatively, a triangulated surface may be referred to as a 2-manifold with nonzero boundary if (i) every edge belongs to either two or to one triangle, and (ii) every vertex belongs to either a ring or an interval of triangles homeomorphic to a disk or half-disk. To illustrate, FIG. 6 provides a side view of a 2-manifold cut by a plane. The resulting 2-manifold with nonzero boundary is shaded. FIG. 7 provides a top view of the 2-manifold with nonzero boundary illustrated by FIG. 6, with only the boundary shown.

Figure 3C:
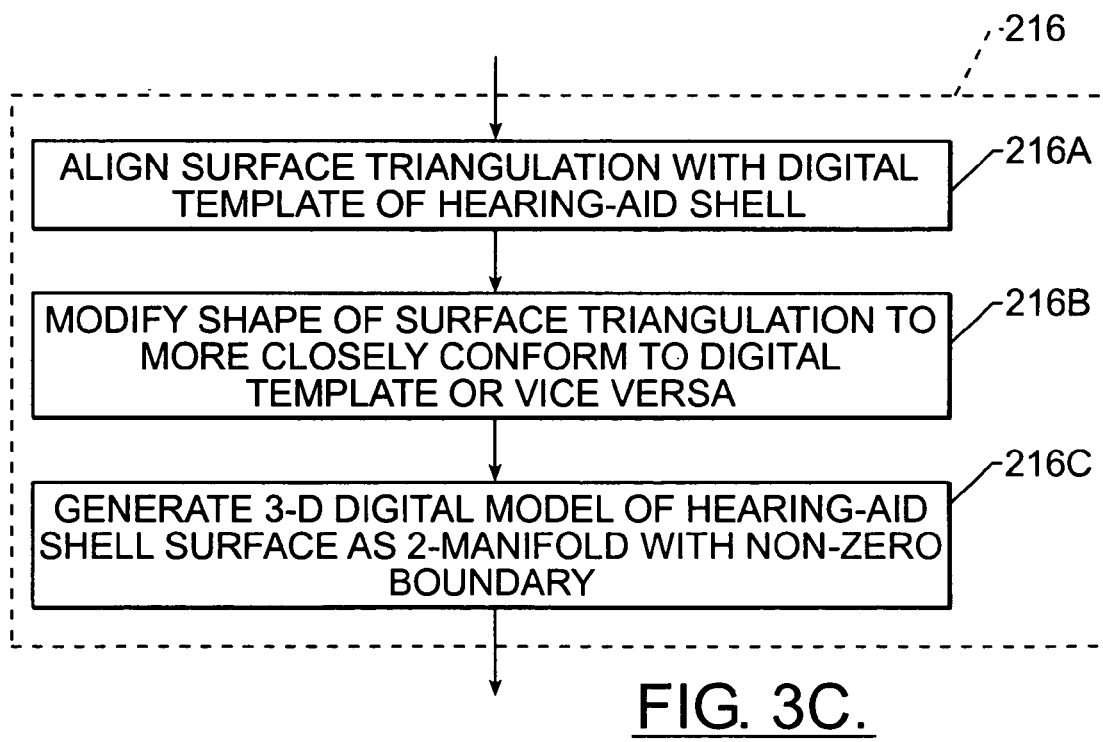
FIG. 3C is a flow diagram of operations that illustrates preferred methods of generating a three-dimensional model of a hearing-aid shell surface from a surface triangulation that describes a shape of an ear-canal of a subject.

Referring now to Block 216 of FIGS. 3B–3D, operations to process the surface triangulation into a three-dimensional model of a hearing-aid shell surface will be described. In particular, FIGS. 3C and 3D illustrate a preferred operation to align the surface triangulation with a digital template of a hearing-aid shell, Block 216A. This digital template may be one of a plurality of possible templates retained in a library that is accessible and scannable by the CAD workstation in order to obtain a template having a highest degree of initial match to the originally generated surface triangulation. The template may comprise a model of a shell surface or a model of a shell having a uniform or nonuniform thickness. This alignment step may be performed automatically by software and/or with the assistance of a design operator using the CAD workstation.

As illustrated by Block 216B of FIG. 3C, a shape of the surface triangulation may then be modified using a sequence of operations to more closely conform to a shape of the template or vice versa. These operations may include computing common areas and intersections between the template and the surface triangulation. Polygons outside the common areas may then be trimmed away to obtain a minimal shape. As illustrated by the right-hand side of FIG. 3D and Block 216C, this minimal shape may be used as a three-dimensional model of a hearing-aid shell surface that is preferably a 2-manifold with nonzero boundary. These modification operations may be automatically performed by the software and/or hardware running on the workstation, however, the design operator may also perform one or more of the modification operations using conventional input devices (e.g., mouse, keyboard, etc.) and interface menus that are provided to a display. Alternatively, the model for the three-dimensional shell surface may be provided as an input file to the workstation operator. Such input file generation may be performed by another component, operator, audiologist or customer during an earlier stage in the manufacturing process.

Referring again to FIG. 3A, the three-dimensional model of a hearing-aid shell surface is then preferably nonuniformly thickened about a directed path P on a surface thereof. This directed path P may identify a desired location of an undersurface hearing-aid vent, Block 220. This thickening operation is preferably performed to define a thickened model of the shell surface as a watertight model that is free of self-intersections. As illustrated by Block 230, an operation is then performed to uniformly thicken the partially thickened model of the shell surface. In particular, the operations of Blocks 220 and 230 preferably include nonuniformly thickening the three-dimensional digital model of the hearing-aid shell surface about the directed path P to determine a partially offset inner shell surface and then uniformly thickening the digital model relative to the partially offset inner shell surface to determine an entirely offset inner shell surface. Alternatively, the preferred sequence of nonuniform and uniform thickening steps may be replaced by a different sequence, including a first nonuniformly thickening operation that results in a partially offset inner shell surface and a second nonuniformly thickening operation that results in an entirely offset inner shell surface. In the event maximizing an interior volume of a manufactured hearing-aid shell is not a desired or necessary design goal, the nonuniformly thickening operation may be replaced by a strictly uniform thickening operation, however such an operation may result in a shell that is unnecessarily thick in regions remote from the hearing-aid vent.

Referring again to Block 220, the operations to nonuniformly thicken the digital model of the hearing-aid shell surface further include thickening the digital model using a bump function b(x) about a kernel K defined by a set of points on the directed path P, as described more fully hereinbelow. This bump function may be derived form a Gaussian distribution function or a spline function, however, other functions may also be used. An operation to determine a first offset of the directed path P' normal to the shell surface is then performed along with an operation to determine a respective normalized adjusted normal $n_x'$ for each of a plurality of vertices on the directed path P using parametrizations P,P': $[0,1] \rightarrow R^3$ proportional to a distance between the directed path P and the first offset of the directed path P'. Here, the operation to determine a respective normalized adjusted normal $n_x'$ preferably includes determining a respective normalized adjusted normal $n_x'$ for each of a plurality of first vertices on the digital model of the shell surface that are within a support of the bump function b(x). This is achieved by mixing an estimated normal at the respective first vertex $n_x$ with the normalized adjusted normal $n_p'$ at a nearest vertex on the directed path P. Preferred techniques for defining a directed path P may result in a directed path that is defined by at least one vertex that is not also a vertex of the digital model of the shell surface. Once a plurality of normalized adjusted normals have been determined, operations may be performed to locally thicken the digital model of the shell surface by moving a first vertex on the shell surface inward along a respective normalized adjusted normal extending from the first vertex $n_x'$. The distance the first vertex is moved is preferably defined by the bump function b(x). Global thickening operations may also be performed, preferably after the nonuniformly thickening operations and after the normals have been readjusted. As described more fully hereinbelow, these operations may include offsetting the inner surface of the shell model by the shell thickness s, by moving vertices on the inner surface along respective normalized re-adjusted normals.

Referring now to Blocks 240 and 250 of FIG. 3A, the thickening operations are preferably followed by operations to generate a digital model of a hearing-aid vent and then merge this model with the thickened model of the shell surface to form a resulting shell, preferably as a 2-manifold triangulation having a nonuniformly thick rim and a vent extending therethrough adjacent a thickest part of the rim. In particular, the operations to generate a digital model of a hearing-aid vent, Block 240, comprise an operation to determine an axis of the vent in the thickened model of the shell surface and determine a surface (e.g., tubular surface) of the vent about the axis. The axis is preferably defined as being offset from the directed path P adjacent a beginning point thereof (adjacent the rim of shell) and as meeting the directed path P at or adjacent its termination point. The resulting surface of the vent may comprise a triangulation that is a 2-manifold with nonzero boundary. Once the axis of the vent has been determined, a plurality of operations can then be performed to determine, for each of a plurality of points on the axis, a respective plane that is normal to the axis and passes through the respective point. Operations are then performed to determine, for each plane, a respective circle having a center on the axis. Moreover, in order to reduce interferences, operations may be performed to tilt a first plurality of the planes and to project each circle associated with the first plurality of tilted planes as an ellipse on the respective tilted plane. The surface of the vent may then be constructed by connecting together the ellipses on the first plurality of tilted planes with any remaining circles on the planes that extend normal to the axis of the vent. As described more fully hereinbelow with respect to FIG. 22, less complex operations may be used to define one or more receiver holes in the shell.

As illustrated by Block 250 and described more fully hereinbelow with respect to FIGS. 8–22, the digital model of the vent is then merged with the three-dimensional model of the hearing-aid shell. This operation may be performed by defining a top vent hole in the rim of the three-dimensional model of the hearing-aid shell and a bottom vent hole adjacent a termination point of the directed path. This operation of defining vent holes will convert the 2-manifold shell surface into a 2-manifold with nonzero boundary. Fully or partially automated operations may then be performed to merge the boundary (i.e., the vent holes) of the model of the hearing-aid shell with the boundary (i.e., ends) of the triangulated vent surface.

Referring now to Block 260, operations to modify the three-dimensional model of a hearing-aid shell may be performed so that what is typically a flat rim of the shell model is more suitable for receiving a supporting frame when printed. As will be understood by those familiar with conventional hearing-aid manufacturing methods, a supporting frame with a hatch cover hinged thereto is typically attached to a printed hearing-aid shell only after a faceplate has been glued to the shell and the faceplate (and shell) have been trimmed and smoothed. The faceplate also has an opening therein in which the supporting frame can be received and permanently or releasably connected.

The preferred operations illustrated by Block 260 include partially or completely automated CAD operations to either digitally modify the shape of the hearing-aid shell to be matingly compatible with a supporting frame when printed, or to digitally merge a generic faceplate model to the rim of the shell and then digitally trim away excess portions and smooth abrupt edges. In particular, these operations may enable a CAD tool operator to visually align a supporting frame to a rim of a displayed digital model of the hearing-aid shell and then mark or identify vertices and/or edges on the frame and shell model to be modified. Operations can then be performed automatically by the CAD tool to fill in the shape of the shell model so that the final shape of the rim is matingly compatible with the supporting frame. Alternatively, the operations of Block 260 may include attaching a digital faceplate model to the rim of the shell model either automatically or after alignment by the CAD tool operator. Automated digital trimming and smoothing operations are then typically performed to generate a final hearing-aid shell model that can be printed, Block 300. The printing operation may be performed using a three-dimensional printer that is communicatively coupled and responsive to commands issued by the CAD tool. In this manner, the manual and time consuming operations illustrated by Blocks 22 and 24 of FIG. 1 can be avoided.

Figure 4:
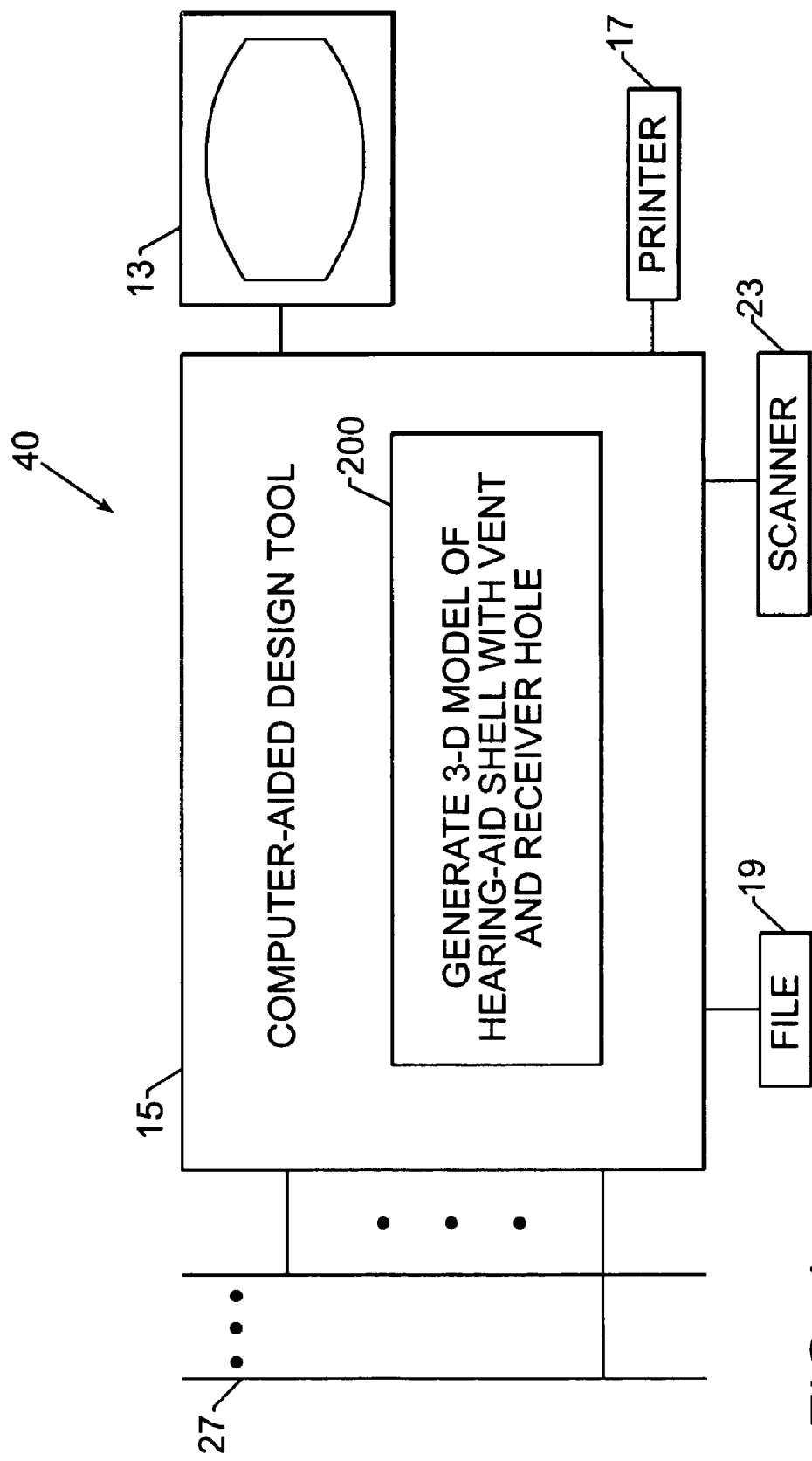
FIG. 4 is a general hardware description of a computer workstation comprising software and hardware for manufacturing hearing-aid shells in accordance with embodiments of the present invention.

Referring now to FIG. 4, a general hardware description of a CAD/CAM workstation 40 is illustrated comprising, among other things, software and hardware aspects of the present invention that perform operations such as processing point cloud data into triangulated surfaces and generating three-dimensional models of hearing-aid shells in accordance with the preferred operations described herein. The workstation 40 preferably includes a computer-aided design tool 15 that may accept a point cloud data representation of an ear canal of a subject via a file 19, a scanner 23 or data bus 27. A display 13 and a printer 17 are also preferably provided to assist in performing the operations of the present invention. The hardware design of the above described components 13, 17, 19, 27 and 23 is well known to those having skill in the art and need not be described further herein.

This workstation 40, which may be used as part of an automated hearing-aid shell manufacturing system, preferably comprises a computer-readable storage medium having computer-readable program code embodied in the medium. This computer-readable program code is readable by one or more processors within the workstation 40 and tangibly embodies a program of instructions executable by the processor to perform the operations described herein and illustrated by the accompanying figures, including FIGS. 3A–3D and 7–22.

Among other things, the computer-readable program includes code that generates a first digital model of a hearing-aid shell (e.g., completely-in-canal (CIC) model) from point cloud data and also performs calculations of the interior volume of the first digital model to determine whether preselected hearing-aid components can fit properly within the interior volume of the first digital model. In the event a proper fit is not detected, the code can also generate a second digital model of a hearing-aid shell that is larger than the first digital model and calculates an interior volume thereof. This second digital model may also be generated from the point cloud data and may constitute a somewhat larger in-the-ear (ITE) model. The code then determines whether the preselected hearing-aid components can fit properly within an interior volume of the second digital model of the hearing-aid shell. If necessary, these operations may be repeated for gradually larger models until a fit is detected. Accordingly, the workstation 40 can perform operations to determine in advance of printing whether a particular model of a hearing-aid shell (e.g., nonuniformly thickened model with vent) will be large enough to support the selected components. The size specifications associated with these internal hearing-aid components may be loaded into the workstation 40 from an internet site or electronic file, for example.

In the foregoing sections, a thorough and complete description of preferred embodiments of the present invention have been provided which would enable one of ordinary skill in the art to make and use the same. Although unnecessary, a detailed mathematical treatment of the above-described operations will now be provided.

Construct Bump Functions

In this section, a generic bump function is constructed from the Gaussian normal distribution function used in probability theory. The bump function can be used to control local thickening as well as local averaging of normal vectors.

Ur bump function. The Gaussian normal distribution with expectation μ=0 and standard deviation σ is given by the function $$f(t) = \frac{1}{\sigma\sqrt{2\pi}} \cdot e^{-\frac{t^2}{2\sigma^2}}.$$

About 68% of all values drawn from the distribution lie between $-\sigma$ and $\sigma$ and more than 99% lie between $-3\sigma$ and $3\sigma$. We define the ur bump function $$g(t) = \max\{C_1 e^{-C_2 t^2} - C_3, 0\}$$

by choosing $C_1$, $C_2$, $C_3$ such that
assuming $C_1 = 1/\sigma\sqrt{2\pi}$ and $C_3 = 0$, as for $f$, the standard deviation is $\sigma = 1$,
$g(0) = 1$, and
$g(t) = 0$ for $|t| \geq 3$.

Figure 8:
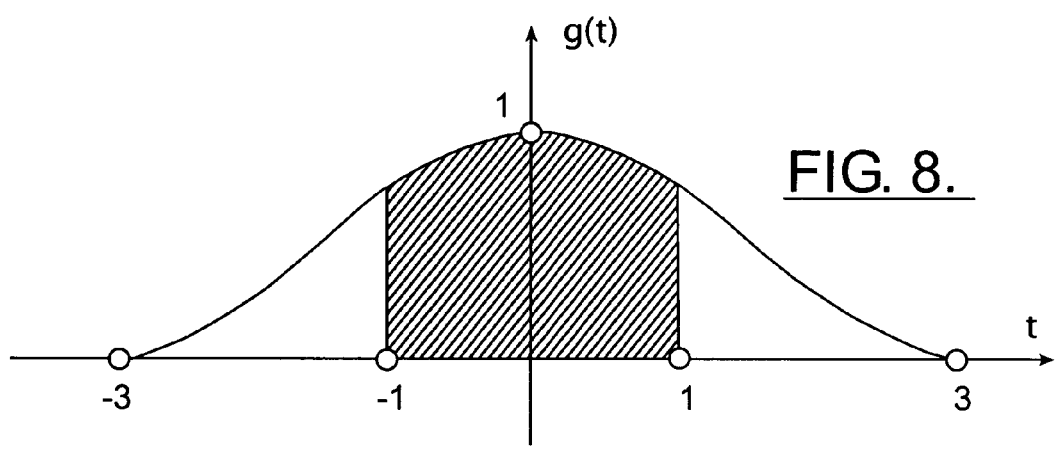
FIG. 8 illustrates the shape of a ur bump function g derived from the Gaussian normal distribution f(t).

The resulting function is illustrated in FIG. 8. The three requirements are satisfied by setting $$C_1 = \frac{1}{1 - e^{-4.5}} = 1.0112\ldots,$$

$$C_2 = \frac{1}{2},$$

$$C_3 = e^{-4.5} \cdot C_1 = 0.0112$$

Figure 9:
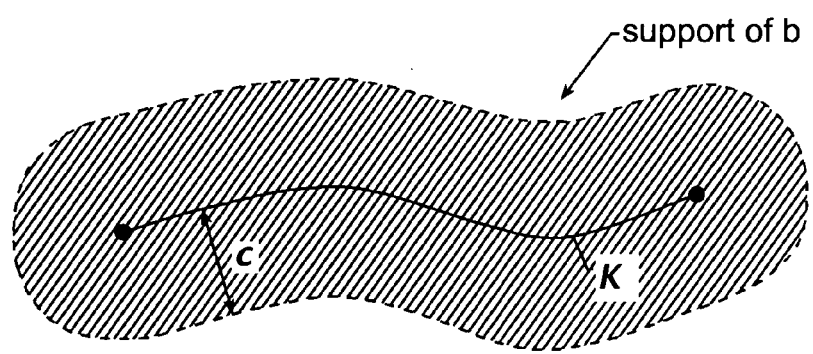
FIG. 9 illustrates a support of a bump function with kernel K and width c.

Two-dimensional bumps. In a preferred application, a bump function is constructed around a kernel K, which can be a single point or a set of points. The bump function reaches its maximum at all points in the kernel and decreases with the distance from the kernel, $$b(x) = a \cdot g(3 d_K(x)/c),$$

where $d_K(x)$ is the minimum distance from x to a point of K. We call a the amplitude and c the width of b. The support is the set of points x with non-zero b(x). FIG. 9 illustrates the definitions by showing the support of a bump function whose kernel is a curve in $R^2$. For example, a bump function may be used to slowly change the estimated unit normal vector at z to that at the nearest point p∈K. In this case we would set a=1 and define $$n'_x = (1-b(x)) \cdot n_x + b(x) \cdot n_p,$$

where $n_x$ and $n_p$ are the old unit normals at x and p.

Figure 10:
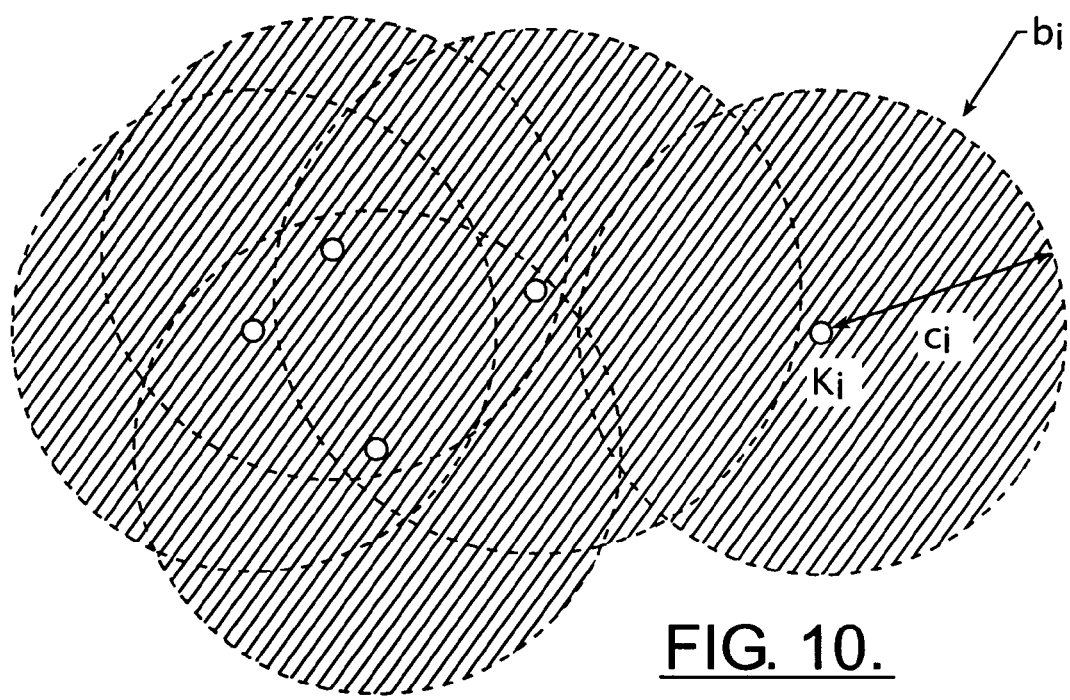
FIG. 10 illustrates a collection of bump functions with overlapping supports.

Overlay of bumps. Suppose we have a number of bump functions $b_i$, each with its own kernel $K_i$, amplitude $a_i$, and width $c_i$, as shown in FIG. 10. We construct a total bump function b that smoothes out the transitions between the $b_i$, and whose support is the union of supports of the $b_i$, $$b(x) = \frac{\sum b_i(x)}{\sum b_i(x)/a_i} \cdot \left(1 - \prod\left(1 - \frac{b_i(x)}{a_i}\right)\right),$$

where the two sums and the product range over all indices i. The first term in the expression is the weighted average of the amplitudes, and the second blends between the various bumps involved. If all amplitudes are the same, then the weighted average is again the same and b(x) majorizes all $b_i(x)$, that is, $b(x) \geq b_i(x)$ for all x and all i.

Perform Non-Uniform Thickening

The 2-manifold with boundary, M, is preferably thickened in two steps. First, a neighborhood of a path sketching the location of the vent is thickened towards the inside. Second, the entire model is thickened uniformly towards the inside. Both steps can be performed to leave the outer boundary of the shell unchanged. We begin by sketching the underground location of the vent as a directed path on the 2-manifold with boundary.

Figure 11:
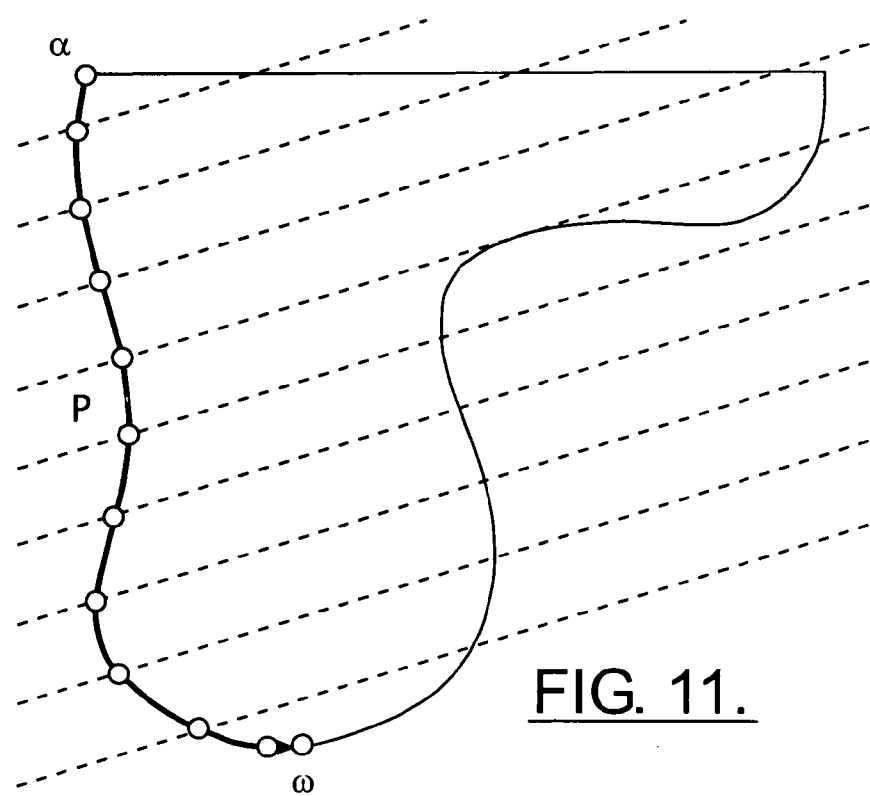
FIG. 11 illustrates the directed path P that sketches the location of the underground vent. The beginning and termination points of the directed path are illustrated as a and w, respectively.

Sketching the vent. The vent will be constructed as a tube of radius r>0 around its axis. We sketch the location of the axis by drawing a path P directed from its initial point α∈Bd M to its terminal point ω∈M−Bd M. Both points are typically specified by the software user, and the path is automatically constructed as part of a silhouette. Let $T_\alpha$ and $T_\omega$ be the tangent planes at α and ω, and let $L = T_\alpha \cap T_\omega$ be their common line. The view of M in the direction of L has both α and ω on the silhouette. We compute P as the part of the silhouette that leads from α to ω, as shown in FIG. 11.

There are a few caveats to the construction of P that deserve to be mentioned. First, the silhouette itself is not necessarily a connected curve. Even small errors in the approximation of a smooth surface will cause the silhouette to consist of possibly many mutually disjoint curves, and such errors are inevitable in any piecewise linear approximation. Second, even if the silhouette were connected, it might wind back and forth if viewed from a normal direction. We solve both difficulties by sampling the silhouette and then constructing a spline curve that approximates but does not necessarily interpolate the sampled point sequence. For the sampling we use some constant number of parallel planes between α and ω, as shown in FIG. 11. The spline curve is constructed with an emphasis on straightness, even that means sacrificing the accuracy of the approximation. Finally, we project the spline curve onto M. A conventional technique for doing the projection can be found in V. Krishnamurthy and M. Levoy, Fitting smooth surfaces to dense polygonal meshes, *Computer Graphics*, Proc. SIGGRAPH 1996, 313–324.

Thickening process. The path P is used in the first thickening step that creates the volume necessary to rout the vent through the hearing-aid shell. A second thickening step is then performed that uniformly affects the entire model. The biggest challenge in thickening is to avoid or repair surface self-intersections. We decompose the thickening process into five steps, three of which are concerned with avoiding or removing self-intersections.

1.1 Adjust normal vectors near the path P.
1.2 Thicken M in a neighborhood of P.
1.3 Re-adjust all normal vectors.
1.4 Thicken the model uniformly everywhere.
1.5 Repair surface self-intersections.

Figure 12:
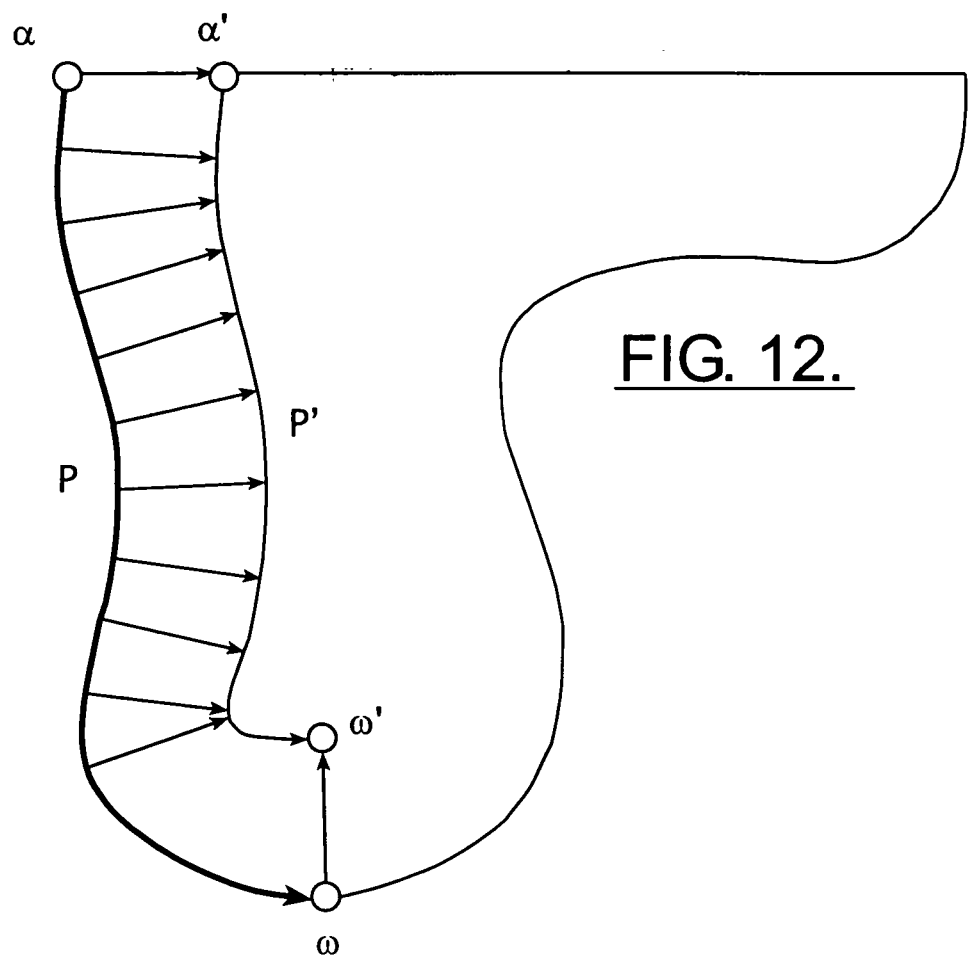
FIG. 12 illustrates offsetting the directed path P as an operation in creating the volume necessary to route the vent illustrated by FIG. 5.

Step 1.1: Adjust normals. To prepare for Step 1.2, we offset P normal to M towards the inside of the model. This is done by moving each vertex of P a distance 2r+2w−s along its estimated normal, where 0<w≤s are the user-specified wall and shell thicknesses. As illustrated in FIG. 12, the resulting path P' leads from the image α' of α to the image ω' of ω. Offset operations frequently create self-intersections, which typically occur at places where the curvature is greater than or equal to one over the offset distance. For the special case of hearing-aid shells, we may assume that such high curvature occurs only near the terminal point ω of P. We thus drop the images of the last few vertices before ω along P and replace the piecewise linear path by a spline approximation P'. Computing spline curves approximating a sequence of points is a well established subject with standard methods described in textbooks in the area of geometric design.

We use parametrizations P, P': [0,1]→R$^3$ proportional to path-length in adjusting normal vectors. For a vertex p=P(λ) we call $$n'_p = \frac{P'(\lambda) - P(\lambda)}{2r + 2\omega - s}$$

the normalized adjusted normal at p. We use this name even though n'$_p$ has only approximately unit length and is only approximately normal to M.

For a vertex x∈M we compute n'$_x$ by mixing the estimated normal at x with the normalized adjusted normal at the nearest point p∈P. The estimated normal at x is n$_x$=l·(Σψ$_i$·n$_i$), where the sum ranges over all triangles in the star of x, ψ$_i$ is the i-th angle around x, and n$_i$ is the inward normal of the i-th triangle. The length of n$_x$ is chosen such that moving x to x+n$_x$ produces an offset of roughly unit thickness along the neighboring triangles. This is achieved by setting $$l = \frac{\sum \frac{\psi_i}{\cos\phi_i}}{(\sum \psi_i) \cdot \|\sum \psi_i \cdot n_i\|},$$

where φ$_i$ is the angle between n$_x$ and the plane of the i-th triangle. To mix n$_x$ with n'$_p$ we use the bump function b with kernel P, amplitude a=1, and width c=3r. In other words, we let t=‖x−p‖/r and define the normalized adjusted normal at x as n'$_x$=(1−g(t))·n$_x$+g(t)·n'$_p$.

Recall that g(t)=0 if |t|≧3. This implies that n'$_x$=n$_x$ if ‖x−p‖≧3r.

Figure 13:
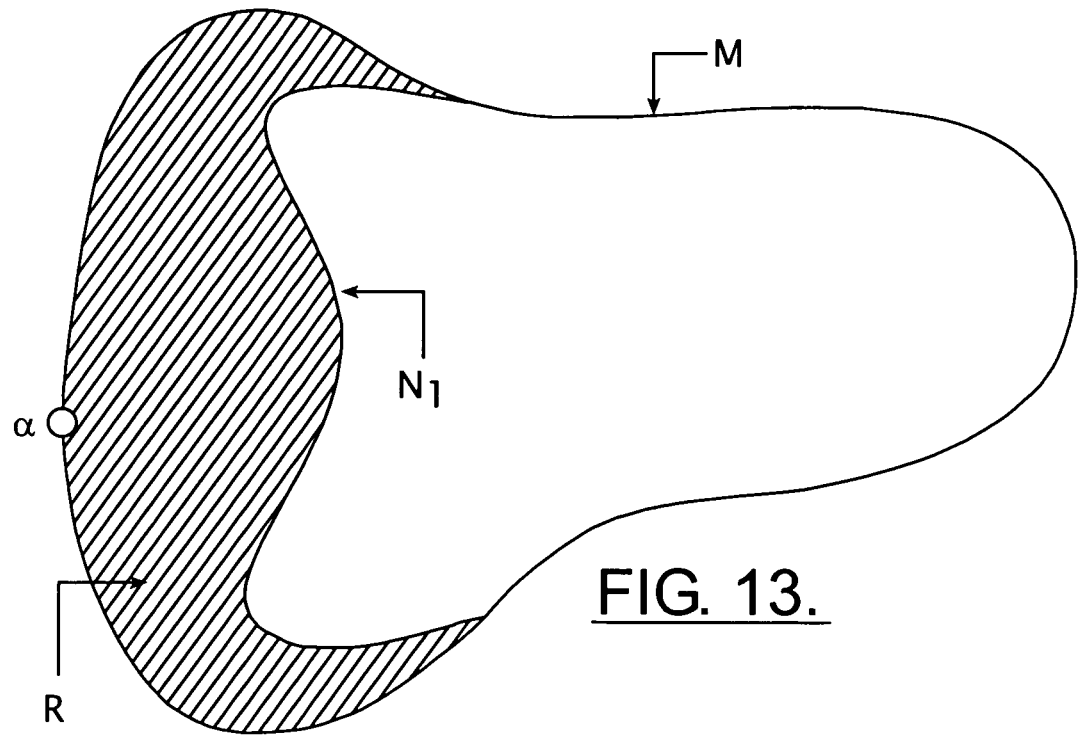
FIG. 13 is a top view of a shell after an initial nonuniformly thickening operation. The rim has a partially positive width (shaded) and a zero width.

Step 1.2: Thicken M around P. The first thickening step used the bump function b with kernel P, amplitude a=2r+2w−s, and width c=3r. It has the same support as the bump function for adjusting normals but possibly different amplitude. We thus thicken by moving x along b(x) n'$_x$, where b(x)=a·g(t) with t=‖x−p‖/r, as before. The result is a bump in the neighborhood of distance up to 3r from P. At distance 3r or more, we do thickening only topologically. This means we create a copy of M there also, but with zero offset from M. Similarly, we construct a partially zero width rim, as shown in FIG. 13. After the thickening step we have the original M (the outer surface), a partially offset copy N$_1$ of M (the inner surface), and a rim R connecting M and N$_1$ along their respective boundaries.

Step 1.3: Re-adjust normals. We change the normal vectors again, this time to prepare for the global thickening operation in Step 1.4. The goal is to eliminate normal fluctuations due to local features of roughly size s, which is the amount of thickening done in Step 1.4. First we detect such features by taking cross-sections of N$_1$ in three pairwise orthogonal directions. For each directions we take a sequence of parallel planes at distance s apart, and we intersect each plane with N$_1$. The result is a polygon in that plane, and we sample points p$_j$ at arc-length distance s along the polygon. For each p$_j$ we let n$_j$ be the normal vector of the polygon at p$_j$. We mark p$_j$ if (i) the angle between n$_j$ and n$_{j+1}$ exceeds a constant θ>0, or
(ii) the angle between n$_j$ and p$_{j+1}$−p$_j$ differs from the right angle by more than θ.

Figure 14:
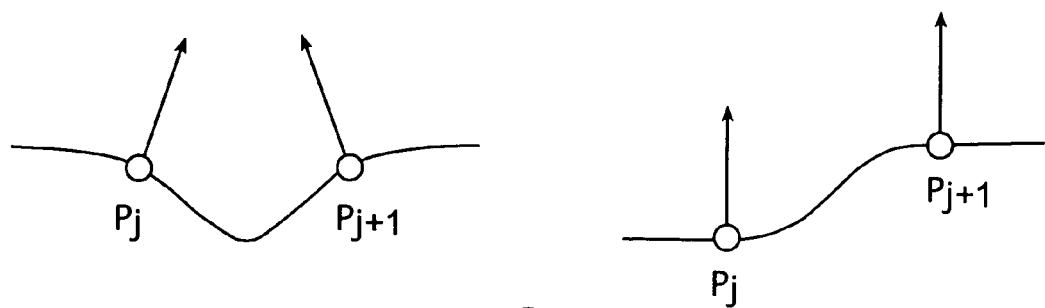
FIG. 14 illustrates surface features of roughly size s.

The two criteria detect small features of the type shown in FIG. 14. We experimentally determined that θ=10° is an appropriate angle threshold for the detection of small features. We note that criterion (i) distinguishes between positive and negative angles and causes p$_j$ to be marked only if the angle from n$_j$ to n$_{j+1}$ is positive. For each marked point p$_j$ we average the estimated normals at P$_{j-1}$, P$_j$, P$_{j+1}$ in N$_1$, and we scale the length of the resulting average normal depending on the local neighborhood of p$_j$, in the same way as in the above definition of the estimated normal.

Finally, we use a bump function b$_j$ for each marked point p$_j$ to locally re-adjust normal vectors. The amplitude of b$_j$ is a$_j$=1 and the width is c$_j$=3s. Let b be the total bump function majorizing the b$_j$. The normalized re-adjusted normal of x is then $$n''_x = (1 - b(x)) \cdot n'_x + b(x) \cdot \frac{\sum b_j(x) \cdot n_j}{\sum b_j(x)}.$$

Figure 15:
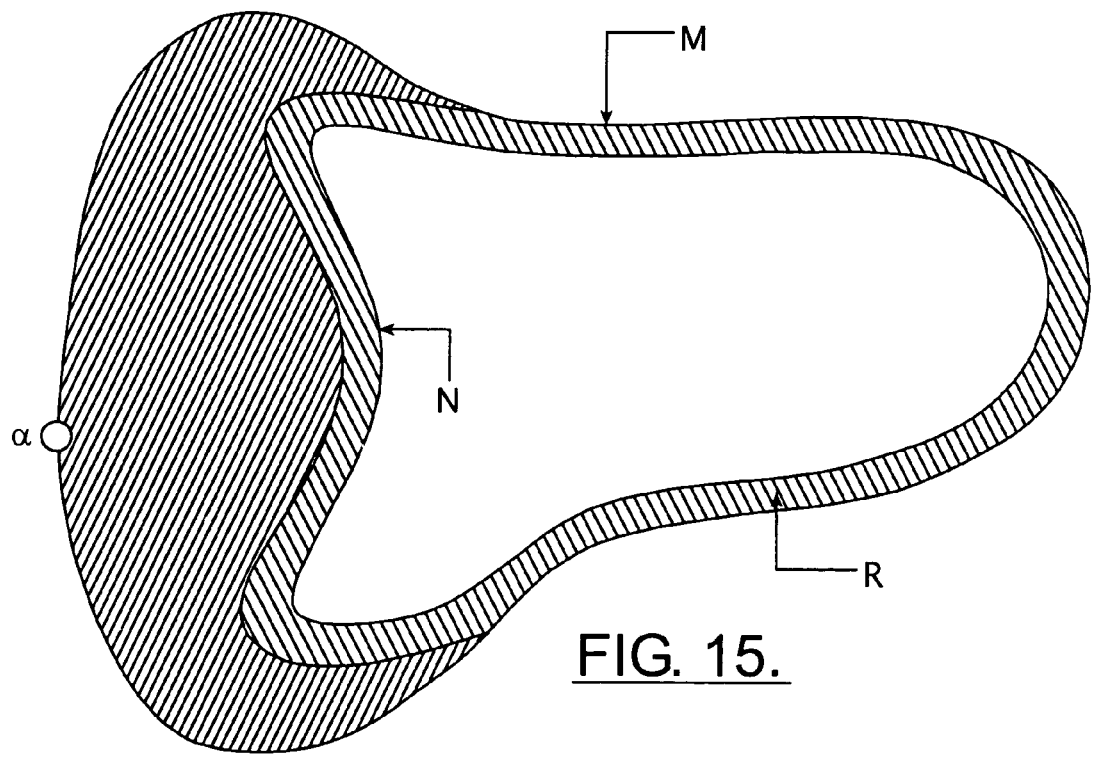
FIG. 15 is a top view of a shell after a final uniform thickening operation. The rim is the entire shaded region.
Figure 16:
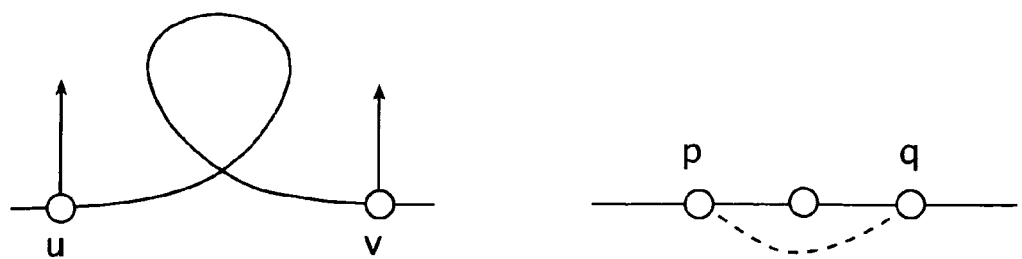
FIG. 16 illustrates a self-intersection (left) and a short-cut (right).

Step 1.4: Thicken globally. The second thickening step offsets N$_1$ by the shell thickness s uniformly everywhere. The result is a new inner surface N and a new rim R with positive width all around, as illustrated in FIG. 15. The shell can now be defined as the volume bounded by S=M∪N∪R.

Step 1.5: Repair surface self-intersections. In the last step we use relaxation to smooth the new inner surface, and at the same time to repair self-intersections, if any. We first relax the boundary of the inner surface, Bd N, which is a closed curve. Troubles arise either when the curve has self-intersections, as in FIG. 16 to the left, or when there are short-cuts in the form of edges in N that connect two non-contiguous vertices along Bd N, as in FIG. 16 to the right. We clean up a self-intersection by determining a vertex u before and a vertex v after the self-intersection such that u and v have roughly parallel normal vectors. We then unwind the path from u to v by rerouting it along the straight line segments connecting u and v. A problematic short-cup between vertices p and q is remedied by flipping the edge pq, or if that is not possibly, by subdividing pq at its midpoint.

Figure 17:
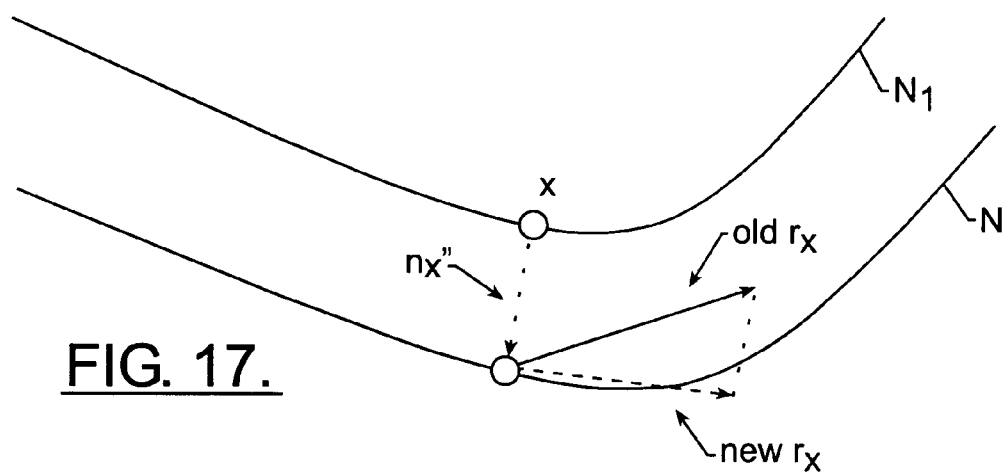
FIG. 17 illustrates a dotted normal vector, a solid relaxation vector and a dashed adjusted relaxation vector.

We second relax the rest of the inner surface N, while keeping Bd N fixed. The relaxation moves each vertex x along its relaxation vector r$_x$ computed from the neighbor vertices of x in N. A conventional relaxation operator is described in an article by G. Taubin, A signal processing approach to fair surface design, *Comput. Graphics*, Proc. SIGGRAPH 1995, 351–358. The motion defined by r$_x$ usually keeps x close to the surface, but in rare cases, r$_x$ can have a significant normal component, as shown in FIG. 17. To determine when this is the case, we compute the projection of r$_x$ onto the vector n''$_x$ used in Step 1.4. If r$_x$ counteracts the thickening operation to the extent that the gained thickness is less than w≦s, then we adjust r$_x$ as shown in FIG. 17.

Formally, the relaxation vector is adjusted as follows.

if ε=−(s−w)−s·(n''$_x$, r$_x$)>0 then $$r_x = r_x + \frac{\varepsilon}{s} \cdot n''_x$$

endif.

The relaxation is then performed using the adjusted vectors.

Creation of Vent in Thickened Model

The thickening operation creates the volume through which we can rout the vent. The basic idea for routing includes: first, offset P to construct the axis and, second, sweep a circle of radius r normally along the axis to construct the vent. The execution of these steps can be complex and frequently requires design iterations.

Figure 18:
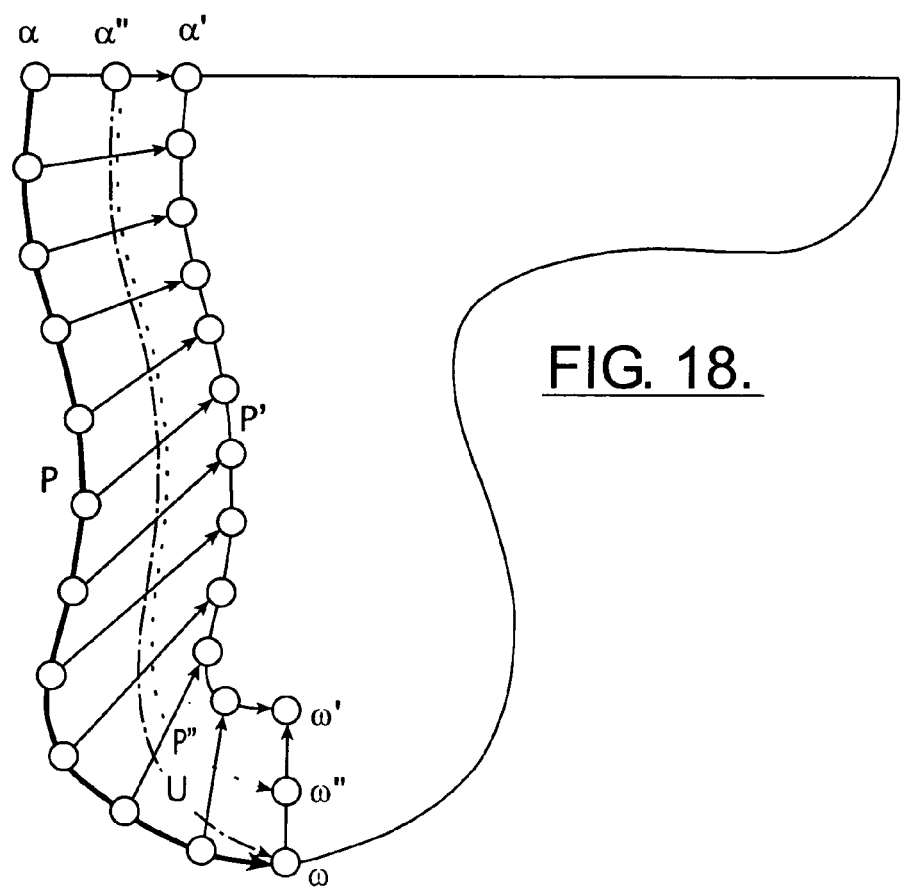
FIG. 18 illustrates a dotted offset path P'" and axis U of the vent.

Vent axis. For the most part, the axis U lies at a fixed distance ratio between P and P'. We therefore start the construction by defining $$P''(\lambda) = \frac{(r+\omega-s) \cdot P(\lambda) + (r+\omega) \cdot P'(\lambda)}{2r + 2\omega - s},$$

for all $0 \leq \lambda \leq 1$. This approximation of the axis is acceptable except near the end where P''(1) does not reach the required terminal point, $\omega$. We thus construct the axis by sampling P'' for $0 \leq \lambda \leq 3/4$, append $\omega$ to the sequence, and construct U as a spline curve that approximates the point sequence and goes from $\alpha''=P''(0)$ to $\omega$. The result of this operation is illustrated in FIG. 18.

Tube construction. The vent is constructed by subtracting the tube of radius r around U from the volume created by thickening. The algorithm iteratively improves the initial design by moving and adjusting the vertices that define the axis and the boundary of the tube. The algorithm proceeds in six steps.

2.1 Construct normal circles $C_i$.
2.2 Construct initial and terminal curves.
2.3 Adjust planes and project $C_i$ to ellipses $E_i$.
2.4 Repair intersections between $E_i$ and S.
2.5 Connect ellipses to form tube boundary.
2.6 Connect tube and shell boundaries.

Step 2.1: Normal circles. Assume a parametrization U: $[0,1] \to R^3$ proportional to path-length, similar to those of P and P'. We sample k+1 points from U by selecting $$u_i = U\left(\frac{i}{k}\right).$$

for all $0 \leq i \leq k$, where k is described below.

Write $z_i$ for the unit tangent vector at point

For each point $u_i$, we let $G_i$ be the plane passing through $u_i$ normal to $z_i$, and we construct the circle $C_i$ of radius r around $u_i$ in $G_i$.

Constructing $C_i$ means selecting some constant number l of points equally spaced along the circle, and connecting these points by edges to form a closed polygon. We use an orthonormal coordinate frame $x_i, y_i$ in $G_i$ and choose the first point on $C_i$ in the direction $x_i$ from $u_i$. Step 2.5 will connect the polygonal approximations of the cross-sections into a triangulated surface. To facilitate this operation, we choose the coordinate frames in a consistent manner as follows. Choose $x_0$ as the normalized projection onto $G_0$ of the estimated normal $n_\alpha$ of $\alpha \in M$. The other vectors xi are obtained by propagation:

for i=1 to k do $x_i = x_{i-1} - (x_{i-1}, z_i) \cdot z_i;\ x_i = x_i/\|x_i\|$ endfor.

Experiments indicate that l=20 is an appropriate choice for the number of points around a cross-section. The resulting edge-length is then just slightly less than $$\frac{2\pi r}{l} = 0.31 \ldots \cdot r.$$

We choose k such that the distance between two adjacent cross-sections is about twice this length: $k=\lceil |U|/4\pi r \rceil$, where $|U|$ is the length of U. The distance between two adjacent planes is then roughly $$\frac{|U|}{r} \approx \frac{4\pi r}{l} = 0.62 \ldots \cdot r.$$

Step 2.2: Limiting curves. The initial and terminal curves are the intersections between the tube boundary and the shell boundary around the initial point $\alpha'$ and the terminal point $\omega$. We construct the initial curve from $C_0$ and the terminal curve from $C_k$. The latter construction is described first.

Figure 19:
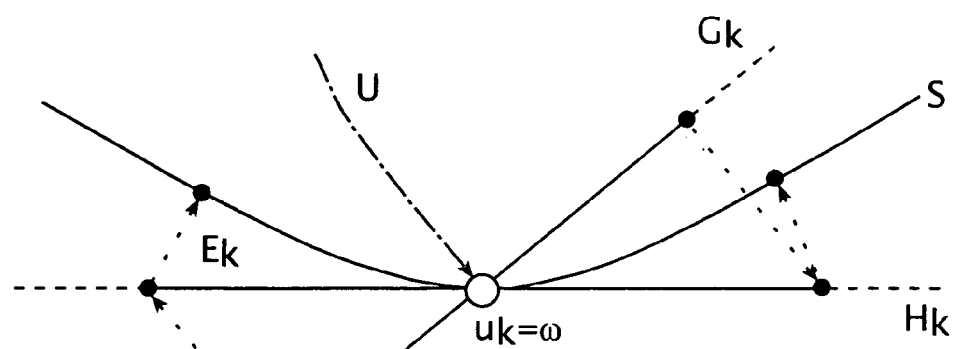
FIG. 19 illustrates a sketch of the terminal curve construction.

Let $H_k = T_\omega$, be the plane tangent to M at point $\omega$. We project $C_k$ parallel to $z_k$ onto $H_k$, as shown in FIG. 19. The result is the ellipse $E_k$ in $H_k$. Finally, we project $E_k$ normally onto M. By design, the neighborhood of $\omega$ in S is fairly flat so that $E_k$ is fairly close to the terminal curve, much closer than suggested by FIG. 19.

The algorithm for the initial curve is similar, leading to the construction of a plane $H_0$, an ellipse $E_0$ in $H_0$, and the initial curve by normal projection of $E_0$ onto S. By construction, the neighborhood of $\alpha''$ in S is contained in the tangent plane, and thus the normal projection just transfers the points of $E_0$ to the representation within S, without changing their positions in space.

Step 2.3: Planes. The circles $C_i$ may interfere with the initial or terminal curves and they may interfere with each other. Such interferences cause trouble in the construction of the vent surface and are avoided by tilting the planes defining the cross-sections. In other words, we construct a new sequence of planes $H_i$ passing through the $u_i$ in an effort to get (i) almost parallel adjacent planes, and
(ii) planes almost normal to the axis.

Objective (i) overwrites (ii). The boundary conditions are defined by the fixed tangent planes $H_0$ and $H_k$, which cannot be changed. The sequence of planes is constructed in two scans over the initial sequence defined by $H_0$, $H_i = G_i$ for $1 \leq i \leq k-1$, and $H_k$.

for i=k-1 downto 1 do
  if DOESINTERFERE($E'_i, H_{i+1}$) then
    TILT($H_i, e_{i+1}$)
  endif
endfor;
for i=1 to k-1 do
  if DOESINTERFERE($E'_i, H_{i-1}$) then
    TILT($H_i, e_{i-1}$)
  endif
endfor.

Here, $E'_i$ is defined similar to $E_i$, except that it is obtained by projecting the somewhat larger circle $C'_i \subseteq G_i$ with center $u_i$ and radius r+w. This larger ellipse includes the necessary buffer around the tube and is therefore more appropriate than $E_i$ in interference and intersection tests. The boolean function DOESINTERFERE returns true if $E'_i$ has non-empty intersection with the adjacent plane, which is $H_{i+1}$ in the first scan and $H_{i-1}$ in the second scan. Note that the interference test is not symmetric, which is one of the reasons we perform two scans, one running up and the other down the sequence. Another reason is that most of the adjustments are done near the initial and terminal planes, whose normal vectors $e_0$ and $e_k$ can be expected to be significantly different from the corresponding tangent vectors $z_0$ and $Z_k$ of U.

Figure 20:
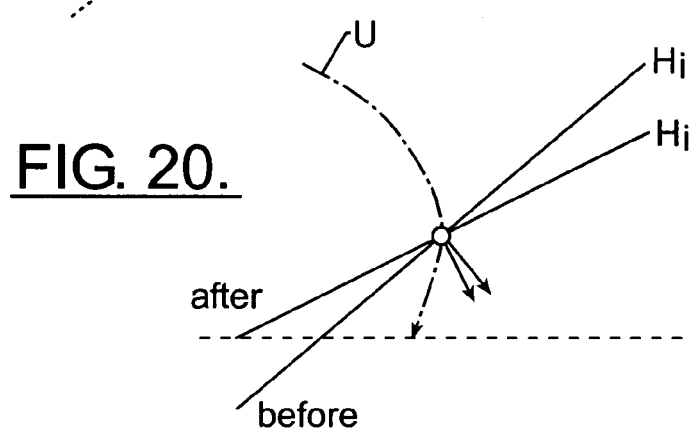
FIG. 20 illustrates an ellipse $E_i'$ before and after tilting the plane $H_i$.

If there is an interference, function TILT adjusts the plane $H_i$ by rotating $e_i$ towards the normal vector of the adjacent plane, which is either $e_{i+1}$ or $e_{i-1}$. The operation is illustrated in FIG. 20.

Step 2.4: Intersections. It is quite possible that the ellipses constructed in Step 2.3 intersect the shell boundary, S. If this happens, we move their centers $u_i$ and thus modify the axis of the vent. If moving the $u_i$ is not sufficient to eliminate all intersections, we thicken the shell by moving the inner surface further inwards. We write the algorithm as three nested loops.

```
for #1 times do
    for #2 times do
        for i=1 to k−1 do
            if E'_i∩S≠∅ then adjust u_i endif
        endfor;
        if no adjustment done then exit endif;
        relax U
    endfor;
    if intersections remain then
        thicken S towards inside
    endif
endfor.
```

We experimentally determined #1=3 and #2=10 as appropriate number of times to repeat the two loops. In most of the cases we thicken S once, and reach an acceptable design after the second iteration.

When we test whether or not $E'_i \cap S = \emptyset$, we compute the cross-section of S along $H_i$, which is a polygon $S_i$. It is convenient to transform the ellipse back to the circle $C'_i$. The same transformation maps Si to a new polygon $S'_i$. We have an intersection iff $S'_i$ contains a point whose distance from ui is less than the radius of $C'_i$, which is r+w. This point can either be a vertex of $S'_i$ or lie on an edge of $S'_i$. We compute the point $x_i \in S'_i$ closest to $u_i$, and we report an intersection if $\|x_i - u_i\| < r+w$. In case of an intersection, we move $u_i$ away from $x_i$:

$$u_i = u_i + (r + \omega - \|u_i - x_i\|) \cdot \frac{u_i - x_i}{\|u_i - x_i\|}.$$

The new point $u_i$ is then projected back to the plane $G_i$, in order to prevent that the movement of sampled points is unduly influenced by the direction of the planes $H_i$. After moving the points $u_i$ we relax the axis they define in order to prevent the introduction of high curvature pieces along U. Then the loop is repeated. We experimentally determined that $\#_2 = 10$ iterations of the loop suffice, and if they do not suffice then the situation is so tight that even further iterations are unlikely to find a solution. We then thicken the shell towards the inside and repeat the outermost loop.

Next we describe how the thickening of the shell is accomplished. We represent each non-empty intersection $E'_i \cap N$ by a bump function bi whose kernel is a point $p_i \in N$. The amplitude measures the amount of thickening necessary to eliminate the intersection. We use roughly elliptic supports with vertical width 4s and horizontal width a little larger than necessary to cover the intersection. The general situation, where there are several and possibly overlapping supports, is illustrated in FIG. 10. Let b(x) be the total bump function as defined above. We thicken by moving x a distance controlled by the total bump function along its normalized re-adjusted normal, $b(x) \cdot n''_x$.

Figure 21:
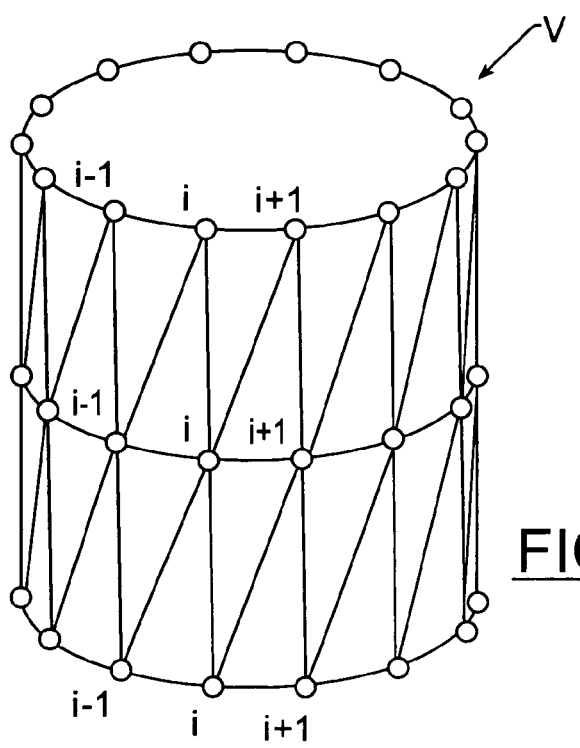
FIG. 21 illustrates a portion of a triangulation of a vent surface.

Step 2.5: Vent surface. Recall that the points defining the ellipses are given in angular orders, and the respective first points are roughly aligned. The points and edges of the ellipses can therefore be connected in straightforward cyclic scans around the cross-sections. The result is a triangulation V representing the boundary of the tube or vent, as illustrated in FIG. 21.

Step 2.6: Connection. To connect the boundary V of the vent with the boundary surface S of the shell, we subdivide S along the initial and terminal curves of V. The two curves bound two disks, which we remove from S. Then S and V are joined at shared curves. The subdivision is likely to create some small or badly shaped triangles, which can be removed by edge contractions triggered by a local application of a surface simplification algorithm.

Construction of Receiver Hole

Figure 22:
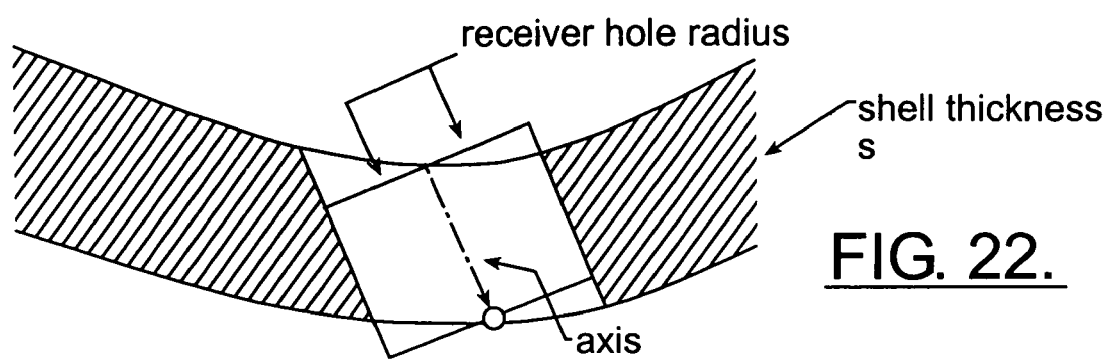
FIG. 22 illustrates a receiver hole specified by axis and radius.

The receiver hole is a short tunnel that passes through the volume of the shell right next to the end of the vent, as shown in FIG. 5. Similar to the vent, we construct the hole by removing a circular tube defined by its axis and radius. Because the hole is short, we can restrict ourselves to cylindrical tubes, which are completely specified by the line axis and the radius, as shown in FIG. 22. The cylindrical tube is typically specified by the software user, who selects the radius and defines the axis by giving its terminal point and direction.

The construction of the receiver hole may borrow a few steps of the vent creation algorithm described above. First, the initial and terminal curves of the receiver hole are constructed from a circle normal to the axis, as explained in Steps 2.1 and 2.2. Second, the hole boundary is obtained by connecting the two curves, as explained in Step 2.5. Third, the hole boundary is connected to the shell boundary by subdividing S along the two curves, removing the two disks, and joining the two surfaces along their shared curves, as explained in Step 2.6.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of manufacturing a hearing-aid shell, comprising the steps of:
    nonuniformly thickening a three-dimensional digital model of a shell surface about a directed path thereon to define a thickened model; and
    generating an undersurface hearing-aid vent in the thickened model of the shell surface, at a location proximate the directed path.

2. The method of claim 1, wherein the digital model of the shell surface is a 2-manifold or 2-manifold with nonzero boundary; and wherein the thickened model of the shell surface is a watertight model that is free of self-intersections.

3. The method of claim 1, further comprising the step of uniformly thickening the digital model of the shell surface relative to the partially offset inner shell surface to determine an entirely offset inner shell surface, and wherein said nonuniformly thickening step comprises the step of nonuniformly thickening the digital model of the shell surface about the directed path to determine a partially offset inner shell surface.

4. The method of claim 1, wherein said nonuniformly thickening step comprises the steps of:
nonuniformly thickening the digital model of the shell surface about the directed path to determine a partially offset inner shell surface; and
nonuniformly thickening the digital model of the shell surface having the partially offset inner shell surface to determine an entirely offset inner shell surface.

5. The method of claim 3, wherein said nonuniformly thickening step comprises thickening the digital model of the shell surface using a bump function constructed around a kernel defined by the directed path.

6. The method of claim 5, wherein said nonuniformly thickening step comprises the steps of:
determining a first offset of the directed path normal to the shell surface; and
determining a respective normalized adjusted normal for each of a plurality of vertices on the directed path using parametrizations proportional to a distance between the directed path and the first offset of the directed path.

7. The method of claim 6, wherein said nonuniformly thickening step comprises determining a respective normalized adjusted normal for each of the plurality of first vertices on the digital model of the shell surface that are within a support of the bump function, by mixing an estimated normal at the respective first vertex with the normalized adjusted normal at a nearest vertex on the directed path.

8. The method of claim 7, wherein the digital model of the shell surface is a surface triangulation that includes the plurality of first vertices; and wherein the directed path includes at least one vertex that is not a vertex of the surface triangulation.

9. The method of claim 7, wherein said nonuniformly thickening step comprises locally thickening the digital model of the shell surface by moving a first vertex on the digital model of the shell surface along a respective normalized adjusted normal at the first vertex.

10. The method of claim 9, wherein the first vertex is moved a distance defined by the bump function.

11. The method of claim 2, wherein said nonuniformly thickening step comprises the steps of:
uniformly thickening the digital model of the shell surface to determine an entirely offset inner shell surface; and then
nonuniformly thickening the digital model of the shell surface about the directed path.

12. The method of claim 1, wherein said generating step comprises the steps of:
determining an axis of the vent in the thickened model of the shell surface; and
determining a surface of the vent about the axis.

13. The method of claim 12, wherein the digital model of the shell surface is a 2-manifold with nonzero boundary; wherein the directed path includes beginning and termination points on the digital model of the shell surface; and wherein the axis of the vent is offset from the directed path adjacent the beginning point and meets the directed path adjacent the termination point.

14. The method of claim 12, wherein the surface of the vent is a triangulation.

15. The method of claim 14, wherein the thickened model of the shell surface has a nonuniformly thick rim; and wherein the surface of the vent intersects the thickened model of the shell surface at a thickest part of the rim.

16. The method of claim 1, wherein said generating step comprises the steps of:
determining an axis of the vent in the thickened model of the shell surface;
determining for each of a plurality of points on the axis, a respective plane that is normal to the axis and passes through the respective point; and
determining for each plane a respective circle having a center on the axis.

17. The method of claim 16, further comprising the steps of:
tilting a first plurality of the planes to reduce interferences; and
projecting each circle associated with the first plurality of tilted planes as an ellipse on the respective tilted plane.

18. The method of claim 17, further comprising the step of determining a surface of the vent by connecting the ellipses on the first plurality of tilted planes.

19. The method of claim 18, wherein the digital model of the shell surface is a 2-manifold with nonzero boundary; wherein the directed path includes beginning and termination points on the digital model of the shell surface; and wherein the axis of the vent is offset from the directed path adjacent the beginning point and meets the directed path adjacent the termination point.

20. The method of claim 19, wherein the surface of the vent is a triangulation.

21. The method of claim 20, wherein the thickened model of the shell surface has a nonuniformly thick rim; and wherein the surface of the vent intersects the thickened model of the shell surface at a thickest part of the rim.

22. A method of manufacturing a hearing-aid shell, comprising the steps of:
generating a three-dimensional digital model of a hearing-aid shell surface from point cloud data;
automatically nonuniformly thickening the digital model about a directed path that identifies a desired location of an undersurface hearing-aid vent, to determine a thickened model having an entirely offset inner shell surface; and
generating the vent in the thickened model, at a location proximate the directed path.

23. The method of claim 22, wherein the thickened model is a watertight model that is free of self-intersections.

24. The method of claim 22, wherein said generating step is preceded by the step of generating point cloud data by scanning an imprint of an ear canal of a user.

25. The method of claim 23, wherein said step of generating the vent is followed by the step of printing a hearing-aid shell having a nonuniform thickness and a vent extending therethrough, based on the thickened model.

26. A method of manufacturing a hearing-aid shell, comprising the step of: generating a watertight model of a hearing-aid shell by nonuniformly thickening a digital model of a hearing-aid shell surface about a portion of the shell surface that defines a desired location of an undersurface hearing-aid vent.

27. The method of claim 26, wherein said step of generating the watertight model comprises nonuniformly thickening the digital model using a bump function constructed around a kernel defined by a set of points on the shell surface.

28. The method of claim 27, wherein the bump function is derived from a Gaussian distribution function or a spline function.

29. The method of claim 26, wherein said step of generating a watertight model is preceded by the steps of:

generating a volume triangulation from point cloud data describing a shape of an ear canal of a subject;

generating a first surface triangulation that is a 2-manifold from the volume triangulation; and generating a second surface triangulation that is a 2-manifold with nonzero boundary from the first surface triangulation by cutting the first triangulation along a plane.

30. The method of claim 29 further comprising the step of generating the hearing-aid vent in the thickened model by:

determining an axis of the hearing-aid vent in the thickened model; and determining a surface of the hearing-aid vent about the axis.

31. The method of claim 26, further comprising the step of generating the hearing-aid vent in the thickened model by:

determining an axis of the hearing-aid vent in the thickened model; and determining a surface of the hearing-aid vent about the axis.

32. A method of manufacturing a hearing-aid shell, comprising the steps of:

generating a surface triangulation of the hearing-aid shell from point cloud data describing a shape of at least a portion of an ear canal of a subject;

generating a watertight 2-manifold triangulation of the hearing-aid shell from the surface triangulation;

generating a 2-manifold with nonzero boundary triangulation of the vent that is compatible with the watertight 2-manifold triangulation of the hearing aid shell; and printing a three-dimensional hearing-aid shell based on the watertight 2-manifold triangulation of the hearing-aid shell and the 2-manifold with nonzero boundary vent triangulation.

33. The method of claim 32, further comprising the steps of: generating a 2-manifold with nonzero boundary triangulation of the hearing-aid shell from the watertight 2-manifold triangulation of the hearing aid shell, by defining vent holes therein; and merging the 2-manifold with nonzero boundary triangulation of the vent and the 2-manifold with nonzero boundary triangulation of the hearing-aid shell to define a watertight 2-manifold triangulation of the hearing-aid shell having a vent therein.

34. A method of manufacturing a hearing-aid shell, comprising the step of: thickening a three-dimensional digital model of a hearing-aid shell surface using operations that move each of a plurality of vertices on the shell surface along a respective path that is normal to an inner shell surface.

35. The method of claim 34, wherein the digital model of the hearing-aid shell surface is thickened sufficiently to support formation of a hearing-aid vent in a wall thereof upon printing of the thickened digital model.

36. The method of claim 34, wherein the thickened digital model of the hearing-aid shell is a watertight digital model that is free of self-intersections.

37. The method of claim 34, wherein said thickening step comprises:

nonuniformly thickening the three-dimensional digital model of the hearing-aid shell surface about a directed path that identifies a desired location of an undersurface hearing-aid vent, to determine a partially offset inner shell surface; and uniformly thickening the three-dimensional digital model of the hearing-aid shell surface relative to the partially offset inner shell surface to determine an entirely offset inner shell surface.

38. The method of claim 34, wherein said thickening step comprises:

nonuniformly thickening the three-dimensional digital model of the hearing-aid shell surface to determine a partially offset inner shell surface; and nonuniformly thickening the three-dimensional digital model of the hearing-aid shell surface having the partially offset inner shell surface to determine an entirely offset inner shell surface.

39. The method of claim 34, wherein the three-dimensional digital model of the hearing-aid shell surface is a surface triangulation; and wherein said thickening step is followed by the step of printing the hearing-aid shell based on the thickened digital model.

40. An automated hearing-aid shell manufacturing system, comprising:

a computer-readable storage medium having computer-readable program code embodied in said medium, said computer-readable program code comprising: computer-readable program code that generates a first digital model of a hearing-aid shell from point cloud data; and computer-readable program code that determines whether first internal hearing-aid components can fit properly within an interior volume of the first digital model of the hearing-aid shell.

41. The manufacturing system of claim 40, wherein said computer-readable program code further comprises:

computer-readable program code that generates a second digital model of a hearing-aid shell that is larger than the first digital model, from the point cloud data; and computer-readable program code that determines whether the first internal hearing-aid components can fit properly within an interior volume of the second digital model of the hearing-aid shell.

42. The manufacturing system of claim 41, wherein the first digital model is a completely-in-ear-canal (CIC) digital model and the second digital model is an in-the-ear (ITE) digital model.

43. An automated hearing-aid shell manufacturing system, comprising:

a scanning tool that generates point cloud data describing a shape of at least a portion of an ear canal of a subject, from the ear canal of the subject or an impression of the ear canal of the subject; and a computer-readable storage medium having computer-readable program code embodied in said medium, said computer-readable program code comprising: computer-readable program code that generates a digital model of a hearing-aid shell from the point cloud data; and computer-readable program code that determines whether size specifications of internal hearing-aid components are compatible with an interior volume of the digital model of the hearing-aid shell.

44. The manufacturing system of claim 43, wherein said computer-readable storage medium comprises computer-readable program code that determines whether size specifications of internal hearing-aid components loaded from an internet site or electronic file are compatible with an interior volume of the digital model of the hearing-aid shell.

45. The manufacturing system of claim 43, wherein said computer-readable storage medium comprises computer-readable program code that generates a digital model of a hearing-aid shell surface as a 2-manifold with nonzero boundary from the point cloud data and nonuniformly thickens the shell surface about a directed path that identifies a desired location of an undersurface hearing-aid vent.

46. The manufacturing system of claim 45, wherein the point cloud data is a 2-manifold triangulation or 2-manifold with nonzero boundary triangulation; and wherein said computer-readable storage medium comprises computer-readable program code that generates a digital model of a vent in the nonuniformly thickened shell surface at a location proximate the directed path.

47. The manufacturing system of claim 43, wherein said computer-readable storage medium comprises computer-readable program code that generates a digital model of a hearing-aid shell surface as a 2-manifold with nonzero boundary from the point cloud data and thickens the shell surface using operations that move each of a plurality of vertices on the shell surface along a respective path that is normal to an inner shell surface.

48. The manufacturing system of claim 47, wherein said computer-readable storage medium comprises computer-readable program code that generates a digital model of a vent in the thickened shell surface.

49. The manufacturing system of claim 48, wherein said computer-readable storage medium comprises computer-readable program code that determines whether size specifications of internal hearing-aid components loaded from an internet site or electronic file are compatible with an interior volume of the digital model of the hearing-aid shell.

50. A method of generating a digital model of a hearing-aid shell, comprising the step of: generating a three-dimensional model of a hearing-aid shell surface by modifying a shape of a first digital model of a positive or negative representation of at least a portion of an ear canal of a subject to more closely conform to a shape of a digital template of a hearing-aid shell and/or modifying the shape of the digital template to more closely conform to the shape of the first digital model.

51. The method of claim 50, wherein said generating step is preceded by the steps of:
generating point cloud data describing a shape of at least a portion of an ear canal of a subject by scanning either the ear canal of the subject or an impression of the ear canal of the subject;
generating a volume triangulation from the point cloud data; and
generating the first digital model as a surface triangulation that is a 2-manifold or 2-manifold with nonzero boundary.

52. The method of claim 50, further comprising the step of: nonuniformly thickening the three-dimensional model of the hearing-aid shell surface using operations that move each of a plurality of vertices on the shell surface along a respective path that is normal to an inner shell surface.

53. A method of manufacturing a hearing-aid shell, comprising the steps of:
generating a first digital representation of a positive or negative image of at least a portion of an ear canal of a subject;
generating a second digital representation of a hearing-aid shell that has a shape that conforms to the ear canal of the subject; and
printing a hearing-aid shell that conforms to the ear canal of the subject, based on the second digital representation.

54. The method of claim 53, wherein the first digital representation is a representation selected from the group consisting of a point cloud representation, a 2-manifold triangulation and a 2-manifold with nonzero boundary triangulation.

55. The method of claim 53, wherein said step of generating a second digital representation comprises the step of modifying a shape of the first digital representation to more closely conform to a shape of a digital template of a hearing-aid shell and/or modifying the shape of the digital template to more closely conform to the shape of the first digital representation.

56. The method of claim 53, wherein said step of generating a second digital representation comprises the steps of: generating a three-dimensional model of a hearing-aid shell surface that is a 2-manifold or 2-manifold with nonzero boundary; and thickening the three-dimensional model of the hearing-aid shell surface using operations that move each of a plurality of vertices on the shell surface along a respective path that is normal to an inner shell surface.

57. The method of claim 53, wherein said step of generating a second digital representation comprises the steps of: generating a three-dimensional model of a hearing-aid shell surface that is a 2-manifold or 2-manifold with nonzero boundary; and nonuniformly thickening the three-dimensional model of the hearing-aid shell surface about a directed path thereon to define a thickened model.

58. The method of claim 57, further comprising the step of generating an undersurface hearing-aid vent in the thickened model of the shell surface, at a location proximate the directed path.

59. The method of claim 58, further comprising the step of uniformly thickening the three-dimensional model of the shell surface relative to the partially offset inner shell surface to determine an entirely offset inner shell surface, and wherein said nonuniformly thickening step comprises the step of nonuniformly thickening the three-dimensional model of the hearing-aid shell surface about the directed path to determine a partially offset inner shell surface.

60. An automated hearing-aid shell manufacturing system, comprising:
a scanning tool that generates point cloud data describing a shape of at least a portion of an ear canal of a subject, from the ear canal of the subject or an impression of the ear canal of the subject; and
a computer-aided design tool that is communicatively coupled to said scanning tool, said computer-aided design tool comprising:
a display; and
a computer system communicatively coupled to said display, said computer system comprising a processor and a computer program product readable by the processor and tangibly embodying a program of instructions executable by the processor to perform the method steps of:
generating a first digital model of at least a portion of the ear canal of the subject from the point cloud data;
aligning a digital template of a hearing-aid shell with the first digital model; and
generating a three-dimensional model of a hearing-aid shell surface by modifying a shape of the digital template to more closely conform to a shape of the first digital model and/or modifying the shape of the first digital model to more closely conform to the shape of the digital template.

61. The manufacturing system of claim 60, wherein the three-dimensional model of the hearing-aid shell surface is a 2-manifold triangulation or a 2-manifold with nonzero boundary triangulation; and wherein said generating step is followed by the step of thickening the three-dimensional model of a hearing-aid shell surface by moving each of a plurality of vertices on the shell surface along a respective path that is normal to an inner shell surface.

62. The manufacturing system of claim 61, wherein said thickening step comprises nonuniformly thickening the three-dimensional model of the hearing-aid shell surface about a directed path thereon that identifies a desired location of an undersurface vent.

63. The manufacturing system of claim 62, wherein said nonuniformly thickening step comprises nonuniformly thickening the three-dimensional model of the hearing-aid shell surface using a bump function constructed around a kernel defined by the directed path.

64. The manufacturing system of claim 63, wherein said nonuniformly thickening step is followed by the steps of:
  aligning a digital model of a frame to the thickened three-dimensional model of the hearing-aid shell surface; and
  modifying a shape of the thickened three-dimensional model of a hearing-aid shell surface to be matingly compatible with the digital model of the frame.

65. The manufacturing system of claim 63, wherein said nonuniformly thickening step is followed by the steps of:
  attaching a digital faceplate model to the thickened three-dimensional model of the hearing-aid shell surface; and
  trimming away portions of the digital faceplate model that are outside an area of intersection between the digital faceplate model and the thickened three-dimensional model of a hearing-aid shell surface.

66. The manufacturing system of claim 65, wherein said trimming step is followed by the step of: digitally smoothing edges of the digital faceplate model.

67. The manufacturing system of claim 66, further comprising: a three-dimensional printer that is communicatively coupled to said computer-aided design tool and prints the thickened three-dimensional model of the hearing-aid shell surface and digital faceplate model attached thereto, in response to a command from said computer-aided design tool.

68. The manufacturing system of claim 64, further comprising: a three-dimensional printer that is communicatively coupled to said computer-aided design tool and prints the modified shape of the thickened three-dimensional model of the hearing-aid shell surface in response to a command from said computer-aided design tool.

69. The manufacturing system of claim 60, wherein the digital template of the hearing-aid shell has an outer surface and an inner surface spaced from the outer surface.

70. The manufacturing system of claim 69, wherein the digital template of the hearing-aid shell is a watertight model that is free of self-intersections.

71. The manufacturing system of claim 70, wherein the digital template of the hearing-aid shell is a 2-manifold triangulation having a vent therein.

72. A method of generating a digital model of a hearing-aid shell, comprising the step of:
  generating a first three-dimensional digital model of a hearing-aid shell; printing the hearing-aid shell based on the first three-dimensional digital model;
  generating point cloud data by scanning the printed hearing-aid shell; and
  generating a second three-dimensional digital model of a hearing-aid shell surface from the point cloud data.

73. The method of claim 72, further comprising the step of: digitally comparing the second three-dimensional digital model of the hearing-aid shell surface against at least a portion of a first three-dimensional digital model of a hearing-aid shell to detect differences therebetween.

74. The method of claim 72, wherein said step of generating a first three-dimensional digital model is preceded by the step of generating an initial three-dimensional digital model of the hearing-aid shell surface by modifying a shape of a first digital model of a positive or negative representation of at least a portion of an ear canal of a subject to more closely conform to a shape of a digital template of a hearing-aid shell and/or modifying the shape of the digital template to more closely conform to the shape of the first digital model.

75. The method of claim 74, further comprising the step of: digitally comparing the second three-dimensional model of the hearing-aid shell surface against the initial three-dimensional model of a hearing-aid shell surface to detect differences therebetween.

76. A method of generating a three-dimensional digital model of a hearing-aid shell, comprising the steps of:
  generating an intermediate model of a hearing-aid shell having a partially offset inner surface by locally thickening a three-dimensional model of a hearing-aid shell surface using operations that move each of a plurality of vertices on the shell surface along a respective path that is defined by a respective normalized adjusted normal to the shell surface; and then
  globally or locally thickening the intermediate model to define an entirely offset inner surface of a thickened model of the shell surface, using operations that move each of a plurality of vertices on the partially offset inner surface along a respective path that is defined by a respective normalized readjusted normal to the partially offset inner surface.

77. The method of claim 76, wherein said locally thickening step comprises locally thickening a three-dimensional model of the hearing-aid shell surface using operations that move each of a plurality of vertices on the shell surface that are within a support of a bump function along a respective path that is defined by a respective normalized adjusted normal.

78. The method of claim 77, wherein said locally thickening step is preceded by the step of designating a location of an undersurface hearing-aid vent on the shell surface; and wherein said locally thickening step comprises locally thickening a three-dimensional model of the hearing-aid shell surface using operations that move each of a plurality of vertices on the shell surface a distance no less than about $2r+2w-s$, where r designates a radius of the vent, w designates a wall thickness and s designates a shell thickness.

79. The method of claim 78, wherein said step of globally or locally thickening the intermediate model is followed by the step of repairing self-intersections on the entirely offset inner surface.

80. The method of claim 79, further comprising the step of generating an undersurface hearing-aid vent in the thickened model of the shell surface.

* * * * *

UNITED STATES PATENT AND TRADEMARK OFFICE
CERTIFICATE OF CORRECTION

PATENT NO. : 7,050,876 B1
APPLICATION NO. : 09/684184
DATED : May 23, 2006
INVENTOR(S) : Ping Fu et al.

It is certified that error appears in the above-identified patent and that said Letters Patent is hereby corrected as shown below:

In column 15, line 40, after the word "selecting", please insert -- $u_i = v\left(\frac{i}{k}\right)$ --

In column 15, line 53, after the word "number", please delete the "1" and insert -- $\ell$ --

In column 16, line 1, please delete "1=20" and insert -- $\ell = 20$ --

In column 16, line 7, in the formula, please delete the "$l$" and insert -- $\ell$ --

In column 16, line 10, in the formula, after the "$|\cup|$" and before the "/4", please delete the "1" and insert -- $\ell$ --

In column 16, line 16, in the formula, please delete the "$l$" and insert -- $\ell$ --

Signed and Sealed this

Seventh Day of August, 2007

JON W. DUDAS
*Director of the United States Patent and Trademark Office*